(12) United States Patent
Tomoda et al.

(10) Patent No.: US 11,275,425 B2
(45) Date of Patent: Mar. 15, 2022

(54) PORTABLE TERMINAL, METHOD, AND COMPUTER PROGRAM FOR CONTROLLING POWER CONSUMPTION BASED ON CONGESTION LEVEL IN A LOCATION

(71) Applicant: Rakuten Group, Inc., Tokyo (JP)

(72) Inventors: Kazuhiro Tomoda, Tokyo (JP); Koji Suzuki, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 127 days.

(21) Appl. No.: 16/331,611

(22) PCT Filed: Sep. 12, 2016

(86) PCT No.: PCT/JP2016/076817
§ 371 (c)(1),
(2) Date: Mar. 8, 2019

(87) PCT Pub. No.: WO2018/047346
PCT Pub. Date: Mar. 15, 2018

(65) Prior Publication Data
US 2019/0361513 A1    Nov. 28, 2019

(51) Int. Cl.
*G06F 1/32*        (2019.01)
*G06F 1/3231*      (2019.01)
*G06F 1/3212*      (2019.01)
*G06F 1/3296*      (2019.01)
*H04W 4/021*       (2018.01)

(52) U.S. Cl.
CPC .......... *G06F 1/3231* (2013.01); *G06F 1/3212* (2013.01); *G06F 1/3296* (2013.01); *H04W 4/021* (2013.01)

(58) Field of Classification Search
None
See application file for complete search history.

(56) References Cited

U.S. PATENT DOCUMENTS

| | | | |
|---|---|---|---|
| 9,516,460 B2* | 12/2016 | Ambrefe, Jr. | H04W 4/029 |
| 2008/0177461 A1* | 7/2008 | Blackwood | G08G 1/096844 |
| | | | 701/532 |
| 2009/0013204 A1 | 1/2009 | Kobayashi et al. | |
| 2010/0070161 A1* | 3/2010 | Harris | G01C 21/20 |
| | | | 701/533 |
| 2011/0040626 A1* | 2/2011 | Lin | H04W 4/029 |
| | | | 705/14.63 |
| 2011/0148750 A1* | 6/2011 | Ayala | G06F 3/147 |
| | | | 345/107 |

(Continued)

FOREIGN PATENT DOCUMENTS

JP    2009-032239 A    2/2009

OTHER PUBLICATIONS

IEEE Guide for Wireless Access in Vehicular Environments (WAVE) Architecture, 2014, Institute of Electrical and Electronics Engineers (Year: 2014).*

(Continued)

*Primary Examiner* — Danny Chan
(74) *Attorney, Agent, or Firm* — Sughrue Mion, PLLC

(57) ABSTRACT

A portable terminal 1 having a battery 11 obtains a congestion level indicating people-related congestion in a range including a point where a specific function of the portable terminal 1 is expected to be executed. Based on the congestion level, the portable terminal 1 performs a reduction process for reducing power consumption of the battery 11 before arriving at the above point, where the specific function is expected to be executed.

35 Claims, 10 Drawing Sheets

(56) References Cited

U.S. PATENT DOCUMENTS

| | | | | |
|---|---|---|---|---|
| 2012/0054098 A1* | 3/2012 | Yu | ............................ | G07B 15/02 |
| | | | | 705/40 |
| 2012/0078501 A1* | 3/2012 | Haleem | ................. | G06F 1/3206 |
| | | | | 701/408 |
| 2013/0345980 A1* | 12/2013 | van Os | ................. | G06F 3/0488 |
| | | | | 701/538 |
| 2014/0013136 A1* | 1/2014 | Dadu | ..................... | H04W 4/029 |
| | | | | 713/323 |
| 2014/0129860 A1* | 5/2014 | Rosenthal | ......... | H04W 52/0264 |
| | | | | 713/323 |
| 2014/0248909 A1* | 9/2014 | Kuntagod | ............. | G01S 5/0027 |
| | | | | 455/456.3 |
| 2015/0087264 A1* | 3/2015 | Goyal | ...................... | G01S 19/34 |
| | | | | 455/411 |
| 2015/0116336 A1* | 4/2015 | Yoshimura | ............. | G09G 5/006 |
| | | | | 345/520 |
| 2015/0169018 A1* | 6/2015 | Rogo | ............... | G08G 1/096783 |
| | | | | 701/2 |
| 2015/0186957 A1* | 7/2015 | Barr | ................... | G06Q 30/0281 |
| | | | | 705/346 |
| 2015/0253146 A1* | 9/2015 | Annapureddy | ... | H04W 52/0264 |
| | | | | 701/490 |

OTHER PUBLICATIONS

Weil, Tim, VPKI Hits the Highway—Secure Communication for the US DOT Connected Vehicle Pilot Program, 2017, IEEE Communications Society Denver Section Dine and Learn (Year: 2017).*

* cited by examiner

FIG. 2A

EXAMPLE ASSOCIATION TABLE FOR FUNCTIONS TO BE RESTRICTED

| NUMERICAL RANGE | FUNCTIONS TO BE RESTRICTED |
|---|---|
| AT LEAST 10 AND LESS THAN 20 | APP FUNCTIONS |
| AT LEAST 20 AND LESS THAN 30 | APP FUNCTIONS<br>WIRELESS LAN COMMUNICATION FUNCTION<br>NEAR FIELD COMMUNICATION FUNCTION |
| AT LEAST 30 | APP FUNCTIONS<br>WIRELESS LAN COMMUNICATION FUNCTION<br>NEAR FIELD COMMUNICATION FUNCTION<br>GPS FUNCTION |

FIG. 2B

EXAMPLE 1 ASSOCIATION TABLE FOR EXECUTION TIMINGS

| NUMERICAL RANGE | EXECUTION TIMING |
|---|---|
| AT LEAST 10 AND LESS THAN 20 | 100 METERS OF EXPECTED EXECUTION POINT |
| AT LEAST 20 AND LESS THAN 30 | 300 METERS OF EXPECTED EXECUTION POINT |
| AT LEAST 30 | 500 METERS OF EXPECTED EXECUTION POINT |

FIG. 2C

EXAMPLE 2 ASSOCIATION TABLE FOR EXECUTION TIMINGS

| NUMERICAL RANGE | EXECUTION TIMING |
|---|---|
| AT LEAST 10 AND LESS THAN 20 | 10 MINUTES BEFORE REFERENCE TIME |
| AT LEAST 20 AND LESS THAN 30 | 30 MINUTES BEFORE REFERENCE TIME |
| AT LEAST 30 | 50 MINUTES BEFORE REFERENCE TIME |

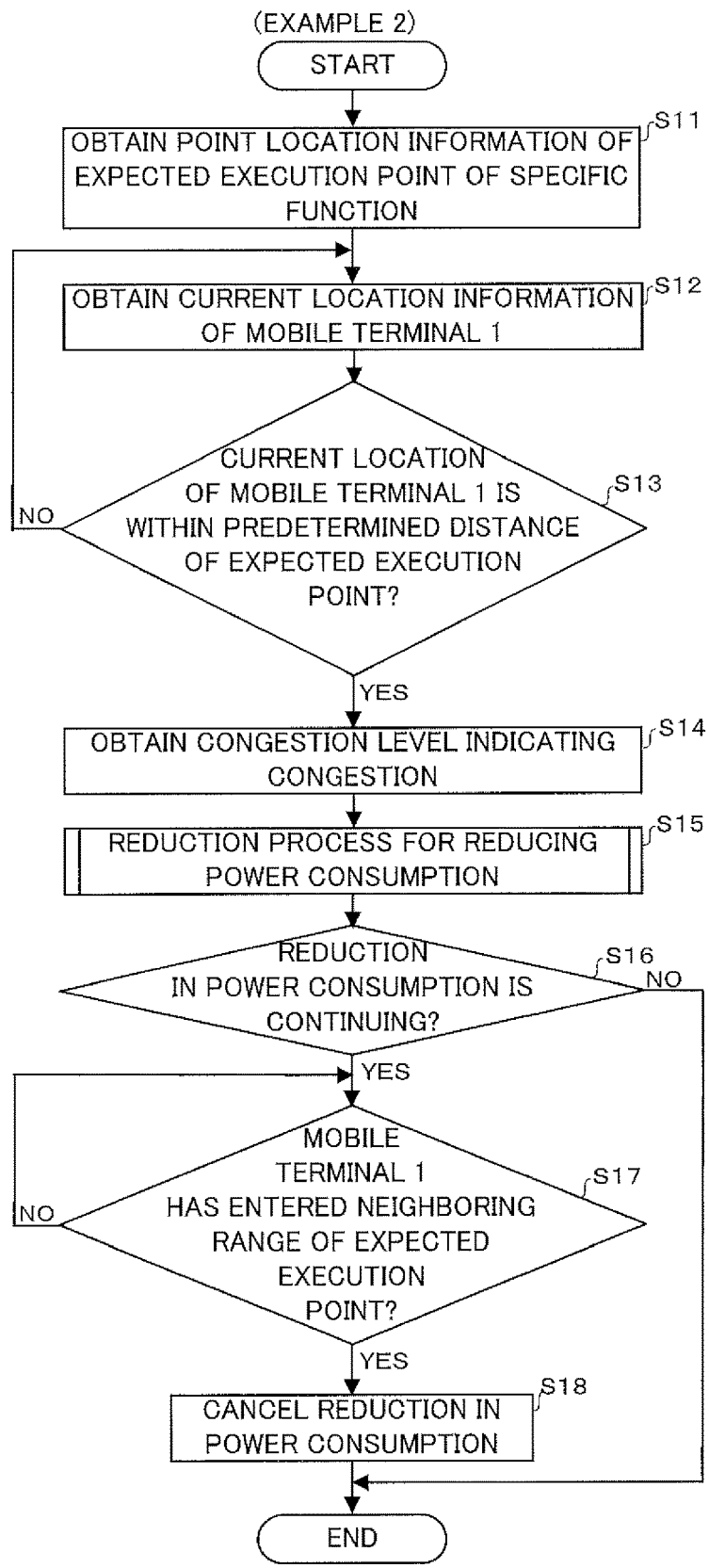

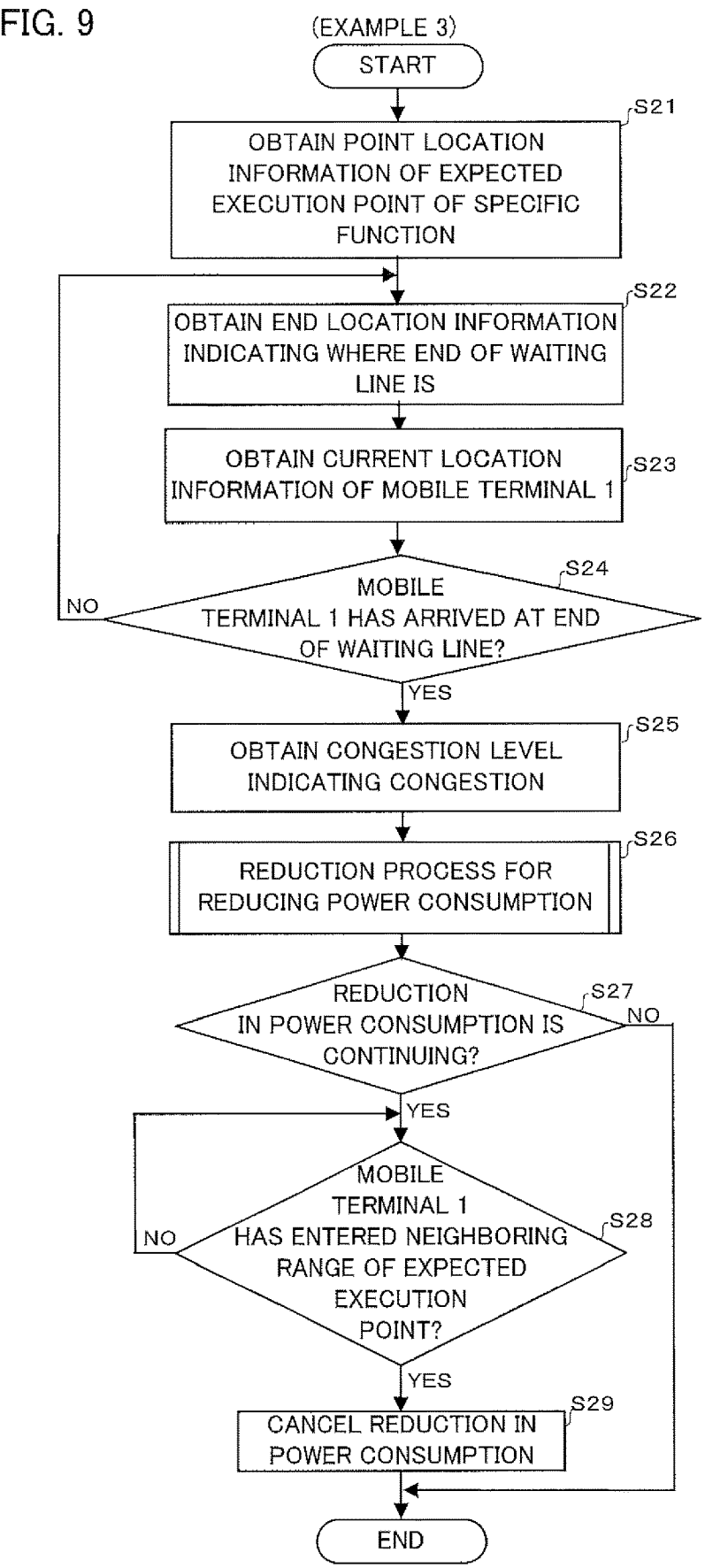

PORTABLE TERMINAL, METHOD, AND COMPUTER PROGRAM FOR CONTROLLING POWER CONSUMPTION BASED ON CONGESTION LEVEL IN A LOCATION

CROSS REFERENCE TO RELATED APPLICATIONS

This application is a National Stage of International Application No. PCT/JP2016/076817, filed Sep. 12, 2016, the contents of which are incorporated herein by reference in its entirety.

TECHNICAL FIELD

The present invention relates to techniques for reducing power consumption of a portable terminal having a battery.

BACKGROUND ART

Conventional techniques for reducing power consumption of a portable terminal are known. For example, Patent Literature 1 discloses a technique for estimating power to be consumed by a specific function of a portable terminal and for displaying how long the specific function can be used or switching the portable terminal into a power saving mode when the amount of remaining power of the portable terminal becomes less than or equal to the amount of power consumption required to continue executing the specific function at the estimated power for a specific period of time.

CITATION LIST

Patent Literature

Patent Literature 1: JP 2009-32239 A

SUMMARY OF INVENTION

Technical Problem

However, even when power is secured in a power saving mode, congestion of people in an area around a point where a specific function of a portable terminal is to be used can cause a shortage of power used for the specific function at the above point. For example, even when the portable terminal is switched into the power saving mode to secure power as disclosed in Patent Literature 1, congestion of people (e.g., a long line of people waiting) in the area around the above point can cause a shortage of power used for the specific function at the point. On the other hand, if the area around the above point is not so congested with people, a shortage of power used for the specific function at the point may not happen even when the portable terminal is not switched into the power saving mode.

Therefore, in view of the above and other points, it is an object of the present invention to provide a portable terminal, a power consumption control program, and a power consumption control method that are capable of flexibly reducing power consumption of a battery, depending on congestion in a range including a point where a specific function of the portable terminal is to be used.

Solution to Problem

To solve the above problem, the invention according to claim 1 is a portable terminal having a battery. The portable terminal includes congestion level obtaining means and reduction process means. The congestion level obtaining means obtains a congestion level indicating people-related congestion in a range including a point where a specific function of the portable terminal is expected to be executed. Based on the congestion level indicating the congestion, the reduction process means performs a reduction process for reducing power consumption of the battery before the portable terminal arrives at the point.

This invention allows power consumption of the battery to be flexibly reduced depending on congestion in a range including a point where the specific function of the portable terminal is to be used.

The invention according to claim 2 is the portable terminal according to claim 1 further including location information obtaining means. The location information obtaining means obtains location information indicating the current location of the portable terminal. Only if the current location indicated by the location information is within a predetermined distance of the point, the reduction process means performs the reduction process.

This invention allows power used for the specific function of the portable terminal to be secured depending on the above congestion, while preventing the portable terminal from becoming less convenient as much as possible.

The invention according to claim 3 is the portable terminal according to claim 1 further including determining means. The determining means determines whether the portable terminal has arrived at the end of a line extending from the point. Only if the determining means determines that the portable terminal has arrived at the end of the line extending from the point, the reduction process means performs the reduction process.

This invention allows power used for the specific function of the portable terminal to be secured depending on the above congestion, while preventing the portable terminal from becoming less convenient as much as possible.

The invention according to claim 4 is the portable terminal according to any one of claims 1 to 3 in which in the reduction process, the reduction process means restricts, among a plurality of functions except the specific function of the portable terminal, at least one function corresponding to the congestion level.

This invention restricts functions corresponding to the congestion level indicated by the above congestion, among the plurality of functions of the portable terminal, thereby more efficiently reducing power consumption of the battery.

The invention according to claim 5 is the portable terminal according to any one of claims 1 to 4 in which when the portable terminal enters a range set as a neighboring range of the point while reduction in the power consumption is continuing, the reduction process means cancels reduction in the power consumption.

This invention allows the reduction in power consumption of the battery to be automatically canceled before execution of the above specific function without placing any cancellation operation burden on a user of the portable terminal, when the portable terminal approaches the point where the above specific function is to be used.

The invention according to claim 6 is the portable terminal according to any one of claims 1 to 5 in which the reduction process means performs the reduction process at a different timing depending on the congestion level.

This invention allows power used for the specific function of the portable terminal to be secured depending on the above congestion, while preventing the portable terminal from becoming less convenient as much as possible.

The invention according to claim 7 is the portable terminal according to any one of claims 1 to 6 in which when the congestion level is greater than or equal to a threshold value, the reduction process means performs the reduction process.

This invention allows the above reduction process to be performed only if the congestion level indicated by the above congestion is greater than or equal to the threshold value.

The invention according to claim 8 is the portable terminal according to claim 7 including usage history obtaining means, predicting means, and setting means. The usage history obtaining means obtains a function usage history of the portable terminal. Based on the usage history, the predicting means predicts the amount of remaining power of the battery in a time slot including an expected execution time of the specific function at the point. The smaller the amount of remaining power predicted by the predicting means is, the smaller the setting means sets the threshold value.

The smaller the amount of remaining power predicted based on the function usage history of the portable terminal is, the more timely this invention allows the above reduction process based on the above congestion to be performed.

The invention according to claim 9 causes a computer included in a portable terminal having a battery to function as congestion level obtaining means and reduction process means. The congestion level obtaining means obtains a congestion level indicating people-related congestion in a range including a point where a specific function of the portable terminal is expected to be executed. Based on the congestion level indicating the congestion, the reduction process means performs a reduction process for reducing power consumption of the battery before the portable terminal arrives at the point.

The invention according to claim 10 is a power consumption control method performed by a portable terminal having a battery. The method includes the following steps. A congestion level indicating people-related congestion in a range including a point where a specific function of the portable terminal is expected to be executed is obtained. Based on the congestion level indicating the congestion, a reduction process for reducing power consumption of the battery is performed before the portable terminal arrives at the point.

Advantageous Effects of Invention

This invention allows power consumption to be flexibly reduced depending on congestion in a range including a point where a specific function of a portable terminal is to be used.

BRIEF DESCRIPTION OF DRAWINGS

FIG. 2A is a diagram showing an example association table for functions to be restricted.

FIGS. 2B and 2C are each a diagram showing an example association table for execution timings.

FIG. 7 is a flowchart showing an example of the power consumption control process performed by the controller 19 of the portable terminal 1 in Example 2.

FIG. 9 is a flowchart showing an example of the power consumption control process performed by the controller 19 of the portable terminal 1 in Example 3.

DESCRIPTION OF EMBODIMENTS

Figure 1B:
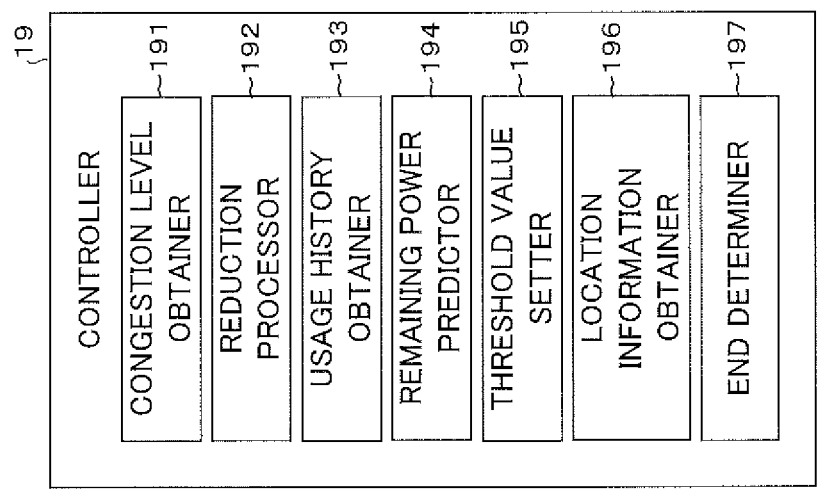
FIG. 1B is a diagram showing example functional blocks of a controller 19.

The following describes an embodiment of the present invention with reference to the drawings.

1. Functional Overview, Configuration, etc. of Portable Terminal 1

First, a functional overview of a portable terminal 1 according to this embodiment is described. The portable terminal 1 according to this embodiment is a portable terminal device having a rechargeable battery. A user can carry his or her portable terminal 1. For example, a smartphone, a portable phone, a tablet, a personal digital assistant (PDA), or a handheld game console can be used as the portable terminal 1. The portable terminal 1 obtains a congestion level indicating congestion (i.e., congestion status) in a range (hereinafter, referred to as a "monitoring range") including a point where a specific function of the portable terminal 1 is expected to be executed (hereinafter, referred to as an "expected execution point") and performs a reduction process for reducing power consumption of its battery before arriving at the above expected execution point, based on the obtained congestion level.

An example of the specific function is the function of displaying or audibly outputting information based on specific electronic data, the function of sending specific electronic data by wireless to equipment installed at the above expected execution point, or the function of receiving specific electronic data from equipment installed at the above expected execution point. Each of these specific functions can be implemented by an application program (hereinafter, referred to as an "APP") that is installed on the portable terminal 1 and runs on an operating system (hereinafter, simply an "OS"). Hereinafter, a function implemented by an APP is referred to as an "APP function". The portable terminal 1 is equipped with other APP functions besides the specific function. The specific function may be a function implemented by the OS.

An example of the electronic data is electronic ticket data, electronic certificate data, or electronic value data. The electronic ticket data is, for example, a ticket (e.g., an admission ticket, a voucher, or a boarding pass) in the form of digital data, which is to be purchased by the user of the portable terminal 1. The certificate data is, for example, an identification of the user of the portable terminal 1 in the form of digital data. The electronic value data is, for example, money having a currency value (e.g., electronic money) in the form of digital data.

The expected execution point of the above specific function is a point where the specific function is to be used, such as an entrance to facilities (e.g., ticket gates). Point location information (e.g., the latitude and longitude) indicating the location of the expected execution point is managed by a predetermined device. An example of the facilities is a store, an amusement park, a garden, a movie theater, a museum, an art gallery, a zoo, a ballpark, a ball game ground, or a station. The facilities may be an event venue at which an event such as a concert is hold. For example, at an entrance to facilities, electronic ticket information based on electronic ticket data prestored in the portable terminal 1 is displayed or audibly output by the above specific function. This allows staff members of the facilities to check whether the electronic ticket data is genuine or fake. If the electronic ticket data is genuine, entry to the facilities is allowed. A staff member of the facilities may check whether the electronic ticket data is genuine or fake by performing a predetermined input operation (e.g., a flick operation) on the electronic ticket information displayed on the screen of the portable terminal 1 by the above specific function to change the look of the electronic ticket information. The electronic ticket data may be a two-dimensional bar code. In this case, a reader reads the two-dimensional bar code correctly to check whether the electronic ticket data is genuine or fake. Alternatively, the above specific function may send electronic ticket data prestored in the portable terminal 1 by wireless to equipment (e.g., a checking device) installed at the entrance, and then the equipment may check whether the electronic ticket data is genuine or fake. Alternatively, the above specific function may send electronic value data prestored in the portable terminal 1 by wireless to equipment (e.g., a payment device) installed at the entrance, and then the equipment may perform a payment process. In this case, if the payment is completed normally, entry to the facilities is allowed (e.g., an entrance gate is opened).

The expected execution point of the above specific function may be the entrance of a section, such as a room, in the facilities. In this case, for example, the above specific function sends electronic certificate data prestored in the portable terminal 1 by wireless to equipment (e.g., an authentication device) installed at the entrance, and then the equipment performs authentication. If the authentication is performed normally, entry to the room is allowed (e.g., the entrance door is unlocked). Alternatively, the expected execution point of the above specific function may be a ticket office where the above ticket is issued. In this case, for example, the above specific function sends electronic value data prestored in the portable terminal 1 by wireless to equipment (e.g., a vending machine) installed at the ticket office, and then the equipment performs a payment process. If the payment is completed normally, the vending machine issues electronic ticket data and sends it to the portable terminal 1 by wireless. The electronic ticket data thus sent is received by the above specific function. Alternatively, when a staff member of the above ticket office or the vending machine receives (cash) payment for electronic ticket data from the user of the portable terminal 1, the electronic ticket data may be issued and sent to the portable terminal 1 by wireless.

Congestion in the monitoring range including the expected execution point of the above specific function is people-related congestion. The people-related congestion includes congestion of people and congestion of vehicles (e.g., bicycles) that carry people. Such congestion can be identified, for example, based on information such as the number of people (or the number of vehicles that carry people) located within the monitoring range including the expected execution point of the above specific function, the length (distance) of a line (waiting line) extending from the expected execution point, the moving speed of the waiting line, or waiting time in the waiting line. As information quantitatively indicating such congestion, a congestion level is used. For example, the larger the number of people (or the number of vehicles that carry people) located within the monitoring range including the expected execution point of the above specific function, the higher (greater) the congestion level. The larger the number of people (or the number of vehicles that carry people) forming the waiting line extending from the expected execution point of the above specific function (i.e., the longer the waiting line), the higher the congestion level. The lower the moving speed of the waiting line, the higher the congestion level. The longer the waiting time in the waiting line, the higher the congestion level. It is desirable that the monitoring range including the expected execution point of the above specific function be a predetermined range in which the number of people, the length of the waiting line, the moving speed of the waiting line, or the waiting time in the waiting line can be identified.

An example of the reduction process for reducing power consumption of the battery on the basis of such a congestion level is a process for restricting APP function (s) of the portable terminal 1, a process for restricting wireless communication function(s) of the portable terminal 1, a process for restricting the global positioning system (GPS) function (i.e., the function of detecting the current location using radio waves transmitted from a plurality of GPS satellites) of the portable terminal 1, or a process for giving a notification message to the user that the portable terminal 1 should be switched into a power saving mode, which will be described in detail later.

Figure 1A:
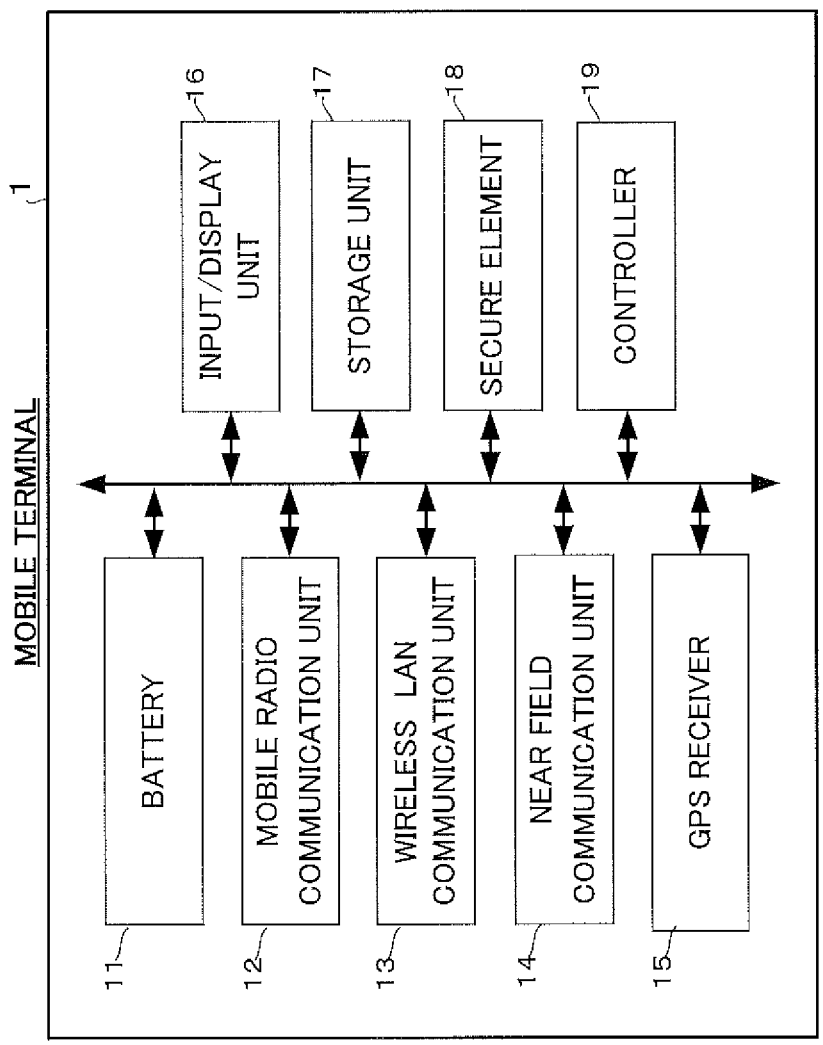
FIG. 1A is a diagram schematically showing an example configuration of a portable terminal 1.

The following describes a configuration etc. of the portable terminal 1 according to this embodiment with reference to FIGS. 1A and 1B. FIG. 1A is a diagram schematically showing an example configuration of the portable terminal 1. As shown in FIG. 1A, the portable terminal 1 includes, for example, a battery 11, a mobile radio communication unit 12, a wireless LAN communication unit 13, a near field communication unit 14, a GPS receiver 15, an input/display unit 16, a storage unit 17, a secure element 18, and a controller 19. The portable terminal 1 may include an audio processor and a speaker.

The battery 11 is a power source for the portable terminal 1 and can be recharged from outside with electricity by which the portable terminal 1 is powered. The battery 11 supplies power to each unit of the portable terminal 1, which the portable terminal 1 includes, under the control of the controller 19. The controller 19 monitors power consumption of the battery 11. For example, the controller 19 monitors the power consumption by measuring the present current consumption rate on the basis of the value of current output from the battery 11. The controller 19 also monitors the amount of remaining power (e.g., remaining battery rate) of the battery 11.

The mobile radio communication unit 12 has a wireless communication function (hereinafter, referred to as a "mobile radio communication function") using a mobile communication network. The mobile communication network includes, for example, a circuit-switched telephone network and a packet-switched data communication network for connection to the Internet. The mobile radio communication unit 12 performs wireless communication with the nearest base station via an antenna to communicate with another portable terminal or a server via the base station and the mobile communication network. The mobile radio communication unit 12 performs cell search for detecting the best cell (e.g., which maximizes the level of received signals) at predetermined intervals, from among cells each of which one base station covers, when in wireless communication standby mode. The time interval for such cell search is controlled by the controller 19. Cell search performed at shorter intervals consumes more power.

The wireless LAN communication unit 13 has a wireless communication function (hereinafter, referred to as a "wireless LAN communication function"), for example, based on the Wi-Fi® standard (IEEE 802.11). The wireless LAN communication unit 13 performs wireless communication with a wireless LAN access point via an antenna to communicate with another portable terminal or a server via the wireless LAN access point and the Internet. The wireless LAN communication function of the wireless LAN communication unit 13 can be turned on or off by the controller 19.

The near field communication unit 14 has a wireless communication function (hereinafter, referred to as a "near field communication function"), for example, based on the Bluetooth® standard (IEEE 802.15.1). The near field communication unit 14 performs wireless communication with another wireless communication device having the near field communication function via an antenna. The near field communication unit 14 further has a near field communication function based on Bluetooth Low Energy (BLE) constituting the Bluetooth® 4.0 standard and receives BLE signals (beacon signals) transmitted another wireless communication device having the near field communication function. The near field communication function of the near field communication unit 14 can be turned on or off by the controller 19. The near field communication unit 14 may have a near field communication function based on the ZigBee standard, the near field radio communication (NFC) standard, or the like.

The GPS receiver 15 receives GPS signals (navigation radio waves) output from a plurality of GPS satellites via an antenna to detect the current location of the portable terminal 1, and then outputs current location information (e.g., the latitude and longitude) indicating the detected current location to the controller 19. There are two methods for detecting the current location. A first detection method is to detect the current location on the basis of GPS signals from three GPS satellites. A second detection method is to detect the current location on the basis of GPS signals from four GPS satellites. The second detection method detects the location with higher accuracy but consumes more power than the first detection method. Switching between the first and second detection methods can be controlled by the controller 19.

The input/display unit 16 includes an input function and a touch screen. The input function receives operation instructions provided by the user's finger, a pen, or the like. The touch screen has a screen that displays information. The input/display unit 16 receives operation instructions from the user and outputs signals corresponding to the operation instructions.

The storage unit 17 includes, for example, a nonvolatile memory and stores the OS, the APPs, and the like. The OS or the APPs include a power consumption control program according to the present invention. The power consumption control program may be downloaded from a predetermined server to the portable terminal 1. Alternatively, the power consumption control program may be stored in a (computer-readable) recording medium, such as a CD or a DVD, and be read from the recording medium into the storage unit 17. The storage unit 17 also stores a function usage history of the portable terminal 1. The usage history includes information about what time each function of the portable terminal 1 was used and how much power the used function consumed.

The secure element 18 includes an IC module (e.g., an IC chip) having a secure memory that stores data safely so as to protect the data against analysis attacks from outside. The secure element 18 stores a secure ID that is information unique to the secure element 18. The secure element 18 also has an applet (e.g., Java® APP) for managing data stored in the secure memory. The data stored in the secure memory includes the above-described electronic data.

The controller 19 includes, for example, a central processing unit (CPU), a read only memory (ROM), and a random access memory (RAM). FIG. 1B is a diagram showing example functional blocks of the controller 19. As shown in FIG. 1B, the controller 19 (a processor in the controller 19) functions as, for example, a congestion level obtainer 191, a reduction processor 192, a usage history obtainer 193, a remaining power predictor 194, a threshold value setter 195, a location information obtainer 196, and an end determiner 197 in accordance with the above power consumption control program, and performs a power consumption control process to be described later. The congestion level obtainer 191 is an example of congestion level obtaining means of the present invention. The reduction processor 192 is an example of reduction process means of the present invention. The usage history obtainer 193 is an example of usage history obtaining means of the present invention. The remaining power predictor 194 is an example of predicting means of the present invention. The threshold value setter 195 is an example of setting means of the present invention. The location information obtainer 196 is an example of location information obtaining means of the present invention. The end determiner 197 is an example of determination means of the present invention.

The congestion level obtainer 191 obtains a congestion level indicating congestion in a monitoring range including an expected execution point of a specific function of the portable terminal 1. As described above, the congestion level can be calculated, for example, based on the number of people (or the number of vehicles that carry people) located within the monitoring range including the expected execution point of the above specific function, the length of awaiting line extending from the expected execution point (or the number of people forming the waiting line), the moving speed of the waiting line, or waiting time in the waiting line. For example, the congestion level is calculated as a numerical value by multiplying the number of people, the length of the waiting line, the inverse of the moving speed of the waiting line, or the waiting time by a predetermined coefficient (e.g., a coefficient that becomes relatively higher as the number of people increases). Alternatively, the congestion level may calculated to be ranked (i.e., graded) according to the number of people, the length of the waiting line, the moving speed of the waiting line, or the waiting time. For example, when ranked A, B, or C (alternatively, ranked Large, Middle, or Small), the congestion level is calculated to be ranked C if the number of people is greater than or equal to 30 but less than 60, to be ranked B if the number of people is greater than or equal to 60 but less than 100, or to be ranked A if the number of people is greater than or equal to 100. The congestion level may be calculated based on a combination of two or more of the number of people, the length of the waiting line, the moving speed of the moving speed of the waiting line, and the waiting time.

The number of people, the length of the waiting line, or the moving speed of the waiting line is identified by a measuring device installed within the above monitoring range to take photographs of the monitoring range with a camera (i.e., identified by analyzing the photograph images). Alternatively, the number of people may be identified by the above measuring device that scans a horizontal plane at tens of centimeters above the ground within the monitoring range using a laser scanner. Alternatively, the number of people may be identified by the above measuring device that measures pressure using a pressure sensor buried under the ground within the monitoring range. Alternatively, the number of people may be the number of people passing through a gate per unit time. In this case, for example, the measuring device identifies the number of people passing through the gate per unit time using a motion sensor installed at the gate within the monitoring range. Waiting time in the waiting line is identified by dividing the length of the waiting line by the moving speed of the waiting line. Alternatively, the waiting time may be identified by multiplying the number of people forming the waiting line by an estimated waiting time per person. The estimated waiting time per person is identified, for example, from a past history.

At least one of the pieces of information thus identified including the number of people, the length of the waiting line, the moving speed of the waiting line, and the waiting time may be sent, for example, with the point location information of the above expected execution point from the above measuring device to a predetermined information gathering server, and then sent from the information gathering server to the portable terminal 1 over the mobile communication network. In this case, the information from the information gathering server is received by the mobile radio communication unit 12. Subsequently, the congestion level obtainer 191 calculates and obtains a congestion level indicating congestion in the monitoring range including the expected execution point, based on the received at least one of the pieces of information including the number of people, the length of the waiting line, the moving speed of the waiting line, and the waiting time. When the portable terminal 1 performs a reduction process based on the above congestion level within a relatively narrow range from the above expected execution point (e.g., within 100 meters of the above expected execution point), the at least one of the above pieces of information including the number of people, the length of the waiting line, the moving speed of the waiting line, and the waiting time may be included with the point location information of the above expected execution point in radio signals (e.g., BLE signals) transmitted by a wireless communication device from the above measuring device. In this case, the maximum communication range (maximum communication distance) within which radio signals (e.g., BLE signals) transmitted from the wireless communication device can be received is set to approximately 100 meters (on the wireless communication device).

The information from the wireless communication device is received by the near field communication unit 14.

Alternatively, the above measuring device may calculate the above congestion level, based on at least one of the identified pieces of information including the number of people, the length of the waiting line, the moving speed of the waiting line, and the waiting time. In this case, the calculated congestion level may be sent with the point location information of the above expected execution point from the above measuring device to the above information gathering server, and then sent from the information gathering server to the portable terminal 1 over the mobile communication network. The congestion level obtainer 191 thus obtains the congestion level via the mobile radio communication unit 12. Alternatively, at least one of the above identified pieces of information including the number of people, the length of the waiting line, the moving speed of the waiting line, and the waiting time may be sent with the point location information of the above expected execution point from the above measuring device to the above information gathering server, and the information gathering server may calculate a congestion level. In this case, the calculated congestion level is sent from the information gathering server to the portable terminal 1 over the mobile communication network, and then obtained by the congestion level obtainer 191. When the portable terminal 1 performs the reduction process based on the above congestion level within a relatively narrow range from the above expected execution point as described above, the above calculated congestion level may be included with the point location information of the above expected execution point in radio signals transmitted by the wireless communication device from the measuring device.

Alternatively, the above congestion level may calculated based on how many tickets the above ticket office issues per certain time period. This is because it can be said that the more tickets are issued per certain time period, the greater the congestion level is. The number of tickets issued per certain time period is counted, for example, by an issuing device installed at the ticket office. The counted number of tickets may be sent with the point location information of the above expected execution point from the above issuing device to a predetermined information gathering server, and then sent from the information gathering server to the portable terminal 1 over the mobile communication network. In this case, the congestion level obtainer 191 calculates and obtains a congestion level indicating congestion in the monitoring range including the expected execution point, based on the number of tickets received by the mobile radio communication unit 12. For example, the congestion level is calculated by multiplying the number of tickets by a predetermined coefficient (e.g., a coefficient that becomes relatively greater as the number of tickets increases). When the portable terminal 1 performs the reduction process based on the above congestion level within a relatively narrow range from the above expected execution point as described above, the above number of tickets may be included with the point location information of the above expected execution point in radio signals transmitted by a wireless communication device from the issuing device.

Alternatively, the above issuing device may calculate the above congestion level, based on the above number of tickets. In this case, the calculated congestion level may be sent with the point location information of the above expected execution point from the above issuing device to the above information gathering server, and then sent from the information gathering server to the portable terminal 1 over the mobile communication network. The congestion level obtainer 191 thus obtains the congestion level via the mobile radio communication unit 12. Alternatively, the above number of tickets may be sent with the point location information of the above expected execution point from the above issuing device to the above information gathering server, and the information gathering server may calculate a congestion level. In this case, the calculated congestion level is sent from the information gathering server to the portable terminal 1 over the mobile communication network, and then obtained by the congestion level obtainer 191. When the portable terminal 1 performs the reduction process based on the above congestion level within a relatively narrow range from the above expected execution point as described above, the above calculated congestion level may be included with the point location information of the above expected execution point in radio signals transmitted by the wireless communication device from the issuing device.

The reduction processor 192 performs the reduction process for reducing power consumption of the battery 11 before the portable terminal 1 arrives at the expected execution point of the above specific function, based on the congestion level obtained by the congestion level obtainer 191. This allows power consumption of the battery 11 to be flexibly reduced depending on congestion in the monitoring range including the expected execution point of the specific function. For example, if the congestion level obtained by the congestion level obtainer 191 is greater than or equal to a threshold value, the reduction processor 192 performs at least one of the following: a process for restricting all or some of the APP functions of the portable terminal 1, a process for restricting all or some of the wireless communication functions of the portable terminal 1, a process for fully or partially restricting the GPS function of the portable terminal 1, and a process for giving a notification message to the user that the portable terminal 1 should be switched into the power saving mode. That is, only if the congestion level is greater than or equal to the threshold value, the reduction processor 192 causes the above reduction process to be performed. Which process to perform if the above congestion level is greater than or equal to the threshold value may, for example, be preset in the above power consumption control program or be prespecified by the user of the portable terminal 1 via the input/display unit 16.

An example of the process for restricting all of the APP functions of the portable terminal 1 is a process for stopping all APP functions except the above specific function (e.g., for stopping all APP functions running in the background). The above reduction process thus restricts all of the APP functions of the portable terminal 1, thereby more efficiently reducing power consumption of the battery 11. An example of the process for restricting some of the APP functions of the portable terminal 1 is a process for lowering the brightness (light level or luminance) of screens displayed by APP functions, a process for simplifying the look of screens displayed by APP functions (e.g., for stopping visual motion effects, including an animation effect), a process for locking automatic update of APPs, or a process for reducing the clock frequency of the CPU that executes APPs. The above reduction process thus restricts some of the APP functions of the portable terminal 1, thereby flexibly reducing power consumption of the battery 11 while maintaining the minimum level required to use the APP functions. In the process for restricting some of the APP functions of the portable terminal 1, at least two of the process for lowering the brightness of screens displayed by APP functions, the process for simplifying the look of screens displayed by APP functions, the process for locking automatic update of APPs, and the process for reducing the clock frequency of the CPU that executes APPs may be performed. Another example of the process for restricting some of the APP functions of the portable terminal 1 is a process for stopping some of a plurality of APP functions except the above specific function (e.g., for stopping any two of three APP functions running in the background).

An example of the process for restricting all of the wireless communication functions of the portable terminal 1 is a process for stopping all of the wireless communication functions (i.e., turning the wireless communication functions off). The above reduction process thus restricts all of the wireless communication functions of the portable terminal 1, thereby more efficiently reducing power consumption of the battery 11. An example of the process for restricting some of the wireless communication functions of the portable terminal 1 is a process for causing the mobile radio communication unit 12 to perform cell search at shorter intervals. Another example of the process for restricting some of the wireless communication functions of the portable terminal 1 is a process for stopping some of a plurality of wireless communication functions (e.g., for stopping any two of the mobile radio communication function, the wireless LAN communication function, and the near field communication function). The above reduction process thus restricts some of the wireless communication functions of the portable terminal 1, thereby flexibly reducing power consumption of the battery 11 while maintaining the minimum level required to use the wireless communication functions. An example of the process for fully restricting the GPS function of the portable terminal 1 is a process for stopping the GPS function (i.e., turning the GPS function off). The above reduction process thus fully restricts the GPS function of the portable terminal 1, thereby more efficiently reducing power consumption of the battery 11. An example of the process for partially restricting the GPS function of the portable terminal 1 is a process for reducing the number of GPS satellites used to detect the current location (e.g., for switching from the above-described second detection method to the first detection method). For example, the notification message that the portable terminal 1 should be switched into the power saving mode may be displayed on the display or audibly output. The above reduction process thus partially restricts the GPS function of the portable terminal 1, thereby flexibly reducing power consumption of the battery 11 while maintaining the minimum level required to use the GPS function.

The threshold value to be compared with the above congestion level may, for example, be preset in the above power consumption control program or be prespecified by the user of the portable terminal 1 via the input/display unit 16. Alternatively, the threshold value may be set based on the amount of remaining power of the battery 11 when an expected execution time of the above specific function can be obtained. In this case, the usage history obtainer 193 obtains the function usage history of the portable terminal 1, for example, from the storage unit 17. The remaining power predictor 194 predicts the amount of remaining power of the battery 11 in a time slot (e.g., a time slot of approximately five to ten minutes) including an expected execution time of the specific function at the above expected execution point, based on the usage history obtained by the usage history obtainer 193. In other words, the remaining power predictor 194 predicts the amount of remaining power of the battery 11 in a time slot including the expected execution time by identifying a charging or discharging schedule for the battery 11 from the usage history obtained by the usage history obtainer 193. For example, a few minutes before a reference time is set as the expected execution time. An example of this reference time is a scheduled opening time, a scheduled curtain time, a scheduled boarding time, or a scheduled departure time. For example, these reference times may be obtained from electronic ticket data stored in the secure memory of the secure element 18 or obtained with the number of people, the congestion level, and other information from the above-described measuring device or information gathering server. Alternatively, the expected execution time may be prespecified by the user of the portable terminal 1 via the input/display unit 16. The threshold value setter 195 sets the threshold value, which is to be compared with the above congestion level, based on the amount of remaining power predicted by the remaining power predictor 194. For example, the smaller the amount of remaining power predicted by the remaining power predictor 194 is, the smaller the threshold value setter 195 sets the threshold value. Consequently, the smaller the amount of remaining power predicted based on the function usage history of the portable terminal 1 is, the more timely the above reduction process based on the above congestion can be performed.

In the above reduction process, the reduction processor 192 may restrict some functions corresponding to the above congestion level, among the above plurality of functions except the above specific function. This restricts functions corresponding to the congestion level, among the plurality of functions of the portable terminal 1, thereby more efficiently reducing power consumption of the battery 11. That is, the reduction processor 192 restricts functions equipped (e.g., functions generally provided) with the portable terminal 1 in a step-by-step manner based on the above congestion level, thereby more flexibly reducing power consumption of the battery 11 without any modification such as adding a special mechanism to reduce power consumption of the battery 11. In this case, for example, by using a table that stores different sets of functions to be restricted (i.e., processes to restrict the functions) in association with mutually different numerical ranges (or ranks), the reduction processor 192 determines which numerical range (or rank) the above congestion level belongs to. Hereinafter, the table is referred to as an "association table for functions to be restricted". FIG. 2A is a diagram showing an example of the association table for functions to be restricted. Such a table is created and stored in the storage unit 17 when the above power consumption control program is installed. With which of the numerical ranges (or ranks) to associate which of the functions may, for example, be preset in the above power consumption control program or be prespecified by the user of the portable terminal 1 via the input/display unit 16.

In the example of FIG. 2A, the APP functions are associated with a numerical range of at least 10 (threshold value) and less than 20. The APP functions, the wireless LAN communication function, and the near field communication function are associated with a numerical range of at least 20 and less than 30. The APP functions, the wireless LAN communication function, the near field communication function, and the GPS function are associated with a numerical range of at least 30. For example, if the congestion level obtained by the congestion level obtainer 191 is "25", the APP functions, the wireless LAN communication function, and the near field communication function, which are associated with the numerical range (at least 20 and less than 30) that the congestion level belongs to, are identified as the functions corresponding to the congestion level from the association table for functions to be restricted, and then a process for restricting the identified functions is performed. The association shown in FIG. 2A is merely an example. Another association may be made, for example, based on which functions the user often uses or which functions consume more power. For example, a function (e.g., the near field communication function) that consumes less power may be associated with a numerical range having relatively lower congestion levels (a numerical range of at least 10 and less than 20), and a function (e.g., the GPS function) that consumes more power may be associated with a numerical range having relatively higher congestion levels (a numerical range of at least 30). Alternatively, some of the APP functions, some of the wireless communication functions, or part of the GPS function of the portable terminal 1 may be associated with a numerical range (or rank). In this case, for example, a process for lowering the brightness of screens displayed by APP functions is associated with the numerical range of at least 10 and less than 20.

The reduction processor 192 may perform the above reduction process at a different timing (hereinafter, referred to as an "execution timing") depending on the above congestion level. This allows the above reduction process to be performed at an appropriate timing based on the above congestion level, thereby securing power used for the specific function of the portable terminal 1 depending on the above congestion, while preventing the above reduction process from making the portable terminal 1 less convenient as much as possible. In this case, for example, by using a table that stores different execution timings in association with mutually different numerical ranges (or ranks), the reduction processor 192 determines which numerical range (or rank) the above congestion level belongs to. Hereinafter, the table is referred to as an "association table for execution timings". FIGS. 2B and 2C are each a diagram showing an example of the association table for execution timings. Such a table is created and stored in the storage unit 17 when the above power consumption control program is installed. With which of the numerical ranges (or ranks) to associate which of the execution timings may, for example, be preset in the above power consumption control program or be prespecified by the user of the portable terminal 1 via the input/display unit 16.

In the example of FIG. 2B, "within 100 meters of the expected execution point" is associated with a numerical range of at least 10 and less than 20. "Within 300 meters of the expected execution point" is associated with a numerical range of at least 20 and less than 30. "Within 500 meters of the expected execution point" is associated with a numerical range of at least 30. According to the table shown in FIG. 2B, the larger the congestion level is (i.e., the more congested it is), the farther from the expected execution point the above reduction process is performed. For example, if the congestion level obtained by the congestion level obtainer 191 is "25", "within 300 meters of the expected execution point", which is associated with the numerical range (at least 20 and less than 30) that the congestion level belongs to, is identified as the execution timing corresponding to the congestion level from the association table for execution timings 1, and then the above reduction process is performed at the identified execution timing. In this case, when the portable terminal 1 enters within 300 meters of the above expected execution point, the above reduction process is performed. To determine whether the portable terminal 1 has entered within a predetermined distance (e.g., 300 meters) of the above expected execution point, the location information obtainer 196 obtains the current location information of the portable terminal 1 from the GPS receiver 15.

Alternatively, the current location information may be obtained via the mobile radio communication unit 12 from a location detecting server that detects the current location of the portable terminal 1 on the basis of the location information of a base station with which the mobile radio communication unit 12 is communicating.

On the other hand, in the example of FIG. 2C, "10 minutes before the reference time (17:30)" is associated with a numerical range of at least 10 and less than 20. As described above, the reference time is a scheduled opening time, a scheduled curtain time, a scheduled boarding time, a scheduled departure time, or the like. "30 minutes before the reference time (17:30)" is associated with a numerical range of at least 20 and less than 30. "50 minutes before the reference time (17:30)" is associated with a numerical range of at least 30. According to the table shown in FIG. 2C, the larger the congestion level is (i.e., the more congested it is), the farther back in time from the reference time the above reduction process is performed. For example, if the congestion level obtained by the congestion level obtainer 191 is "25", "30 minutes before the reference time (17:30)", which is associated with the numerical range (at least 20 and less than 30) that the congestion level belongs to, is identified as the execution timing corresponding to the congestion level from the association table for execution timings 2, and then the above reduction process is performed at the identified execution timing (when the current time reaches 30 minutes before 17:30, in this case).

Then, when the portable terminal 1 enters a range set as a neighboring range of the above expected execution point while continuing to reduce power consumption of the battery 11, the reduction processor 192 cancels the reduction in the power consumption (e.g., cancels the restriction of the above functions to restore their original condition). This allows the reduction in power consumption of the battery 11 to be automatically canceled before execution of the above specific function without placing any cancellation operation burden on the user of the portable terminal 1, when the portable terminal 1 approaches the expected execution point of the above specific function. Thus, the specific function can be executed quickly. The range set as the neighboring range of the expected execution point is, for example, a relatively narrow range that is a radius of approximately several meters from the expected execution point. This neighboring range may, for example, be preset in the above power consumption control program or be set (on the wireless communication device) as the maximum communication range of radio signals for reduction cancellation (e.g., BLE signals including a code indicating reduction cancellation) transmitted from a wireless communication device installed at the expected execution point. When the above neighboring range is preset in the power consumption control program, whether the portable terminal 1 has entered the range set as the neighboring range of the expected execution point is determined based on the current location information obtained by the location information obtainer 196 and on the point location information of the above expected execution point. On the other hand, when the above neighboring range is set as the maximum communication range of radio signals for reduction cancellation, whether the portable terminal 1 has entered the range set as the neighboring range of the expected execution point is determined based on whether any radio signal for reduction cancellation is received.

Whether or not the above congestion level is greater than or equal to the threshold value, the above reduction process may be performed only when a predetermined execution condition is met. This allows the above reduction process to be performed only when there is a great need to reduce the power consumption, thereby securing power used for the specific function of the portable terminal 1 depending on the above congestion, while preventing the above reduction process from making the portable terminal 1 less convenient as much as possible. An examples of this execution condition is that the current location of the portable terminal 1 is within a predetermined distance of the above expected execution point or that the portable terminal 1 has arrived at the end of a waiting line extending from the expected execution point. Such an execution condition may be preset in the above power consumption control program or be prespecified by the user of the portable terminal 1 via the input/display unit 16. When the execution condition is that the current location of the portable terminal 1 is within a predetermined distance of the above expected execution point, the reduction processor 192 determines whether the current location of the portable terminal 1 is within the predetermined distance of the above expected execution point. Only if the current location of the portable terminal 1 is within the predetermined distance of the above expected execution point, the reduction processor 192 performs the above reduction process. On the other hand, when the execution condition is that the portable terminal 1 has arrived at the end of a waiting line extending from the above expected execution point, the end determiner 197 determines whether the portable terminal 1 has arrived at the end of the waiting line extending from the above expected execution point. Only if the end determiner 197 determines that the portable terminal 1 has arrived at the end of the waiting line extending from the above expected execution point, the reduction processor 192 performs the above reduction process. The execution condition may be that the amount of the current remaining power of the battery 11 is less than or equal to a threshold value. In this case, only if the amount of the current remaining power of the battery 11 is less than or equal to the threshold value (i.e., the battery 11 is running low), the reduction processor 192 performs the above reduction process.

2. How Portable Terminal 1 Works

The following describes how the portable terminal 1 according to this embodiment works before arriving at the expected execution point of the specific function, using separate Examples 1 to 3.

Example 1

Figure 3:
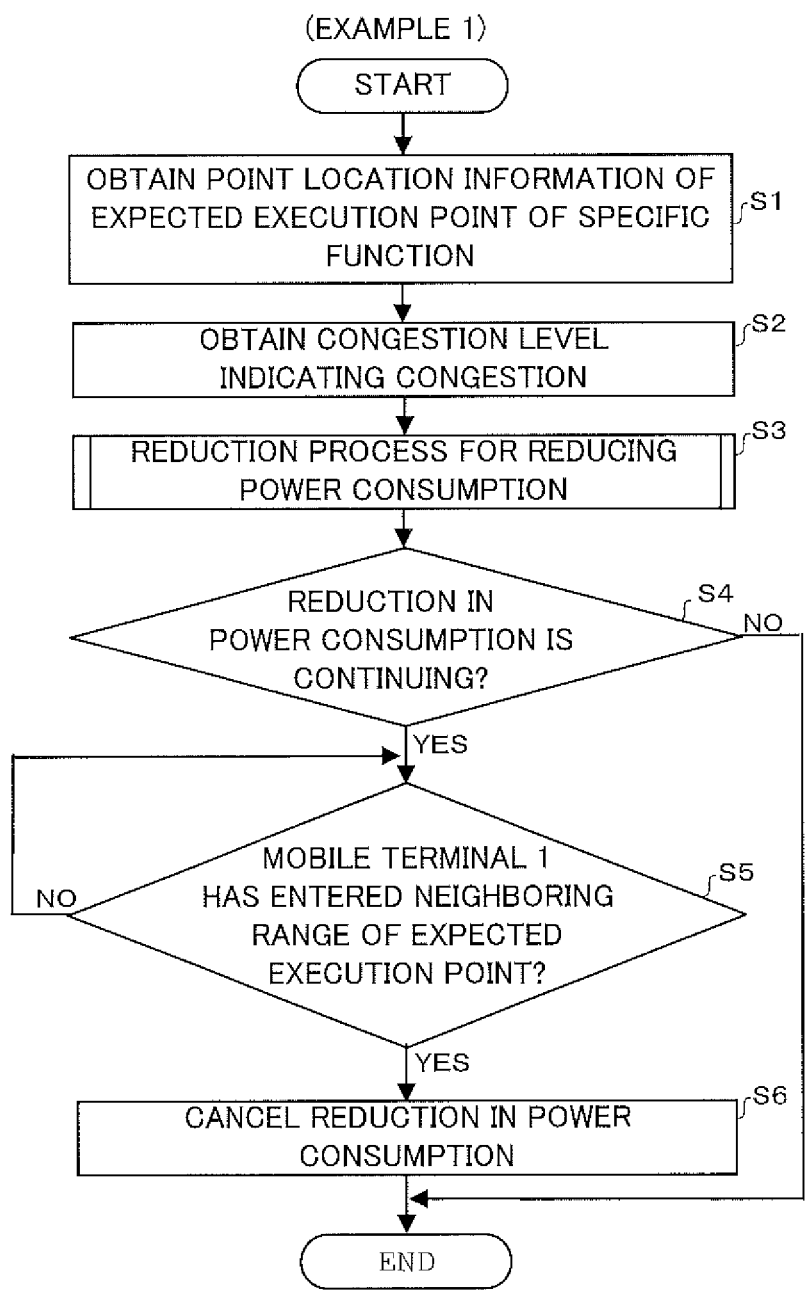
FIG. 3 is a flowchart showing an example of a power consumption control process performed by the controller 19 of the portable terminal 1 in Example 1.

First, how the portable terminal 1 according to Example 1 works is described with reference to FIGS. 3 to 6. FIG. 3 is a flowchart showing an example of the power consumption control process performed by the controller 19 of the portable terminal 1 in Example 1. FIGS. 4A, 4B, 5A and 5B are each a flowchart showing details of the reduction process in Step S3 shown in FIG. 3. Any one of the processes shown in FIGS. 4A, 4B, 5A and 5B is preset as a process to be performed. FIGS. 6A and 6B are each a conceptual diagram showing the positional relationship between the portable terminal 1 and an expected execution point of its specific function.

The power consumption control process shown in FIG. 3 is started, for example, in response to instructions to launch the above power consumption control program from the user. When the power consumption control process shown in FIG. 3 is started, the controller 19 obtains the point location information of the expected execution point of the specific function of the portable terminal 1 (Step S1). The point location information of the expected execution point is obtained from map data, for example, based on what the user of the portable terminal 1 specifies on a map screen displayed on the input/display unit 16 when the power consumption control process is started. Alternatively, the point location information of the expected execution point may be obtained from a point list (e.g., a list including expected execution points of the specific function), based on what the user of the portable terminal 1 specifies on a point list screen displayed on the input/display unit 16 when the power consumption control process is started. Alternatively, the point location information of the expected execution point may be obtained from a ticket list (e.g., a list including electronic ticket data to be used at the expected execution point of the specific function), based on what the user of the portable terminal 1 specifies on a ticket list screen displayed on the input/display unit 16 when the power consumption control process is started.

Subsequently, the controller 19 (the congestion level obtainer 191) obtains a congestion level indicating congestion in a monitoring range including the expected execution point indicated by the point location information obtained in Step S1 (Step S2). For example, the controller 19 (the congestion level obtainer 191) inquires of the above information gathering server a congestion level by using the point location information obtained in Step S1 as a key to obtain the congestion level from the information gathering server via the mobile radio communication unit 12. Alternatively, the controller 19 (the congestion level obtainer 191) may inquire of the above information gathering server information such as the number of people by using the point location information obtained in Step S1 as a key to obtain the information from the information gathering server via the mobile radio communication unit 12, and then calculate and obtain a congestion level on the basis of the obtained information. Alternatively, as described above, the controller 19 (the congestion level obtainer 191) may obtain a congestion level included with point location information identical to the point location information obtained in Step S1, from radio signals received by the near field communication unit 14. Alternatively, the controller 19 (the congestion level obtainer 191) may obtain information such as the number of people that is included with point location information identical to the point location information obtained in Step S1, from radio signals received by the near field communication unit 14, and then calculate and obtain a congestion level on the basis of the obtained information. There are cases where the above-described reference time is obtained in Step S2.

Next, as shown in any one of FIGS. 4A, 4B, 5A, and 5B, the controller 19 (the reduction processor 192) performs a reduction process for reducing power consumption of the battery 11 before the portable terminal 1 arrives at the expected execution point indicated by the point location information obtained in Step S1, based on the congestion level obtained in Step S2 (Step S3).

Figure 4A:
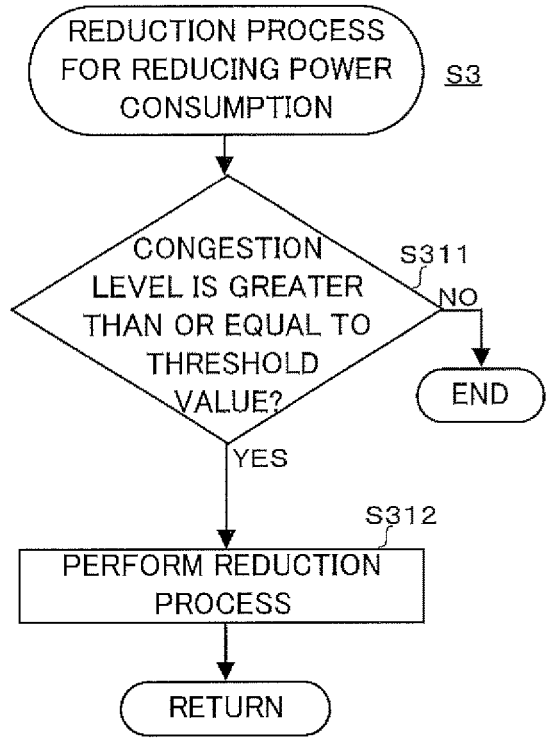
FIGS. 4A and 4B are each a flowchart showing details of a reduction process in Step S3 shown in FIG. 3.

In the reduction process shown in FIG. 4A, the controller 19 (the reduction processor 192) determines whether the congestion level obtained in Step S2 is greater than or equal to a predetermined threshold value (Step S311). If it determines that the above congestion level is not greater than or equal to the threshold value (NO in Step S311, the controller 19 (the reduction processor 192) terminates the reduction process shown in FIG. 4A. In this case, the controller 19 may return to Step S2 a predetermined period of time after the Step S311 and retry the determination in Step S311.

On the other hand, if it determines that the above congestion level is greater than or equal to the threshold value (YES in Step S311), the controller 19 (the reduction processor 192) performs at least one of the following: the process for restricting all or some of the APP functions of the portable terminal 1, the process for restricting all or some of the wireless communication functions of the portable terminal 1, the process for fully or partially restricting the GPS function of the portable terminal 1, and the process for giving a notification message to the user that the portable terminal 1 should be switched into the power saving mode (Step S312). The controller 19 then returns to the process shown in FIG. 3.

Figure 4B:
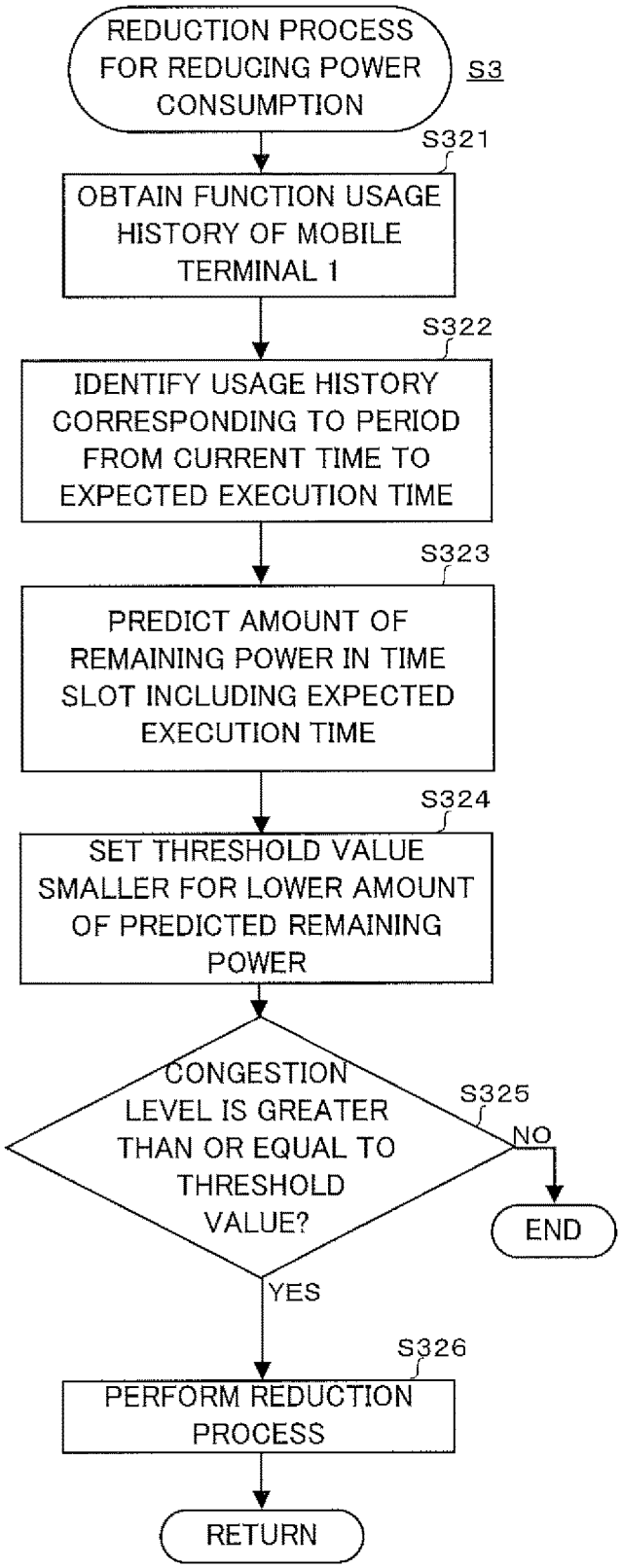

In the reduction process shown in FIG. 4B, the controller 19 (the usage history obtainer 193) obtains the function usage history of the portable terminal 1, for example, from the storage unit 17 (Step S321). The controller 19 (the usage history obtainer 193) then identifies, from the usage history obtained in Step S321, a usage history corresponding to the period from the current time obtained by a clock function of the portable terminal 1 to an expected execution time (e.g., a few minutes before the above reference time) of the above specific function (i.e., a usage history whose usage times are included in the period) (Step S322).

Next, the controller 19 (the remaining power predictor 194) subtracts consumed power indicated by power consumption statuses included in the usage history identified in Step S322 (i.e., power consumed by the used functions) from the amount of the current remaining power of the battery 11 to predict the amount of remaining power of the battery 11 in a time slot including the expected execution time of the above specific function (Step S323). When a plurality of the above usage histories (i.e., a plurality of usages) are identified, the amount of remaining power of the battery 11 is predicted by subtracting total consumed power indicated by power consumption statuses included in the usage histories from the amount of the current remaining power of the battery 11.

Subsequently, the smaller the amount of remaining power predicted in Step S323 is, the smaller the controller 19 (the threshold value setter 195) sets the threshold value to be compared with the above congestion level. For example, the threshold value is calculated by multiplying the above predicted amount of remaining power by a predetermined coefficient (e.g., a coefficient that becomes relatively smaller as the amount of remaining power decreases). Next, the controller 19 (the reduction processor 192) determines whether the congestion level obtained in Step S2 is greater than or equal to the threshold value set in Step S324 (Step S325). After that, the process is performed as with the reduction process shown in FIG. 4A.

Figure 5A:
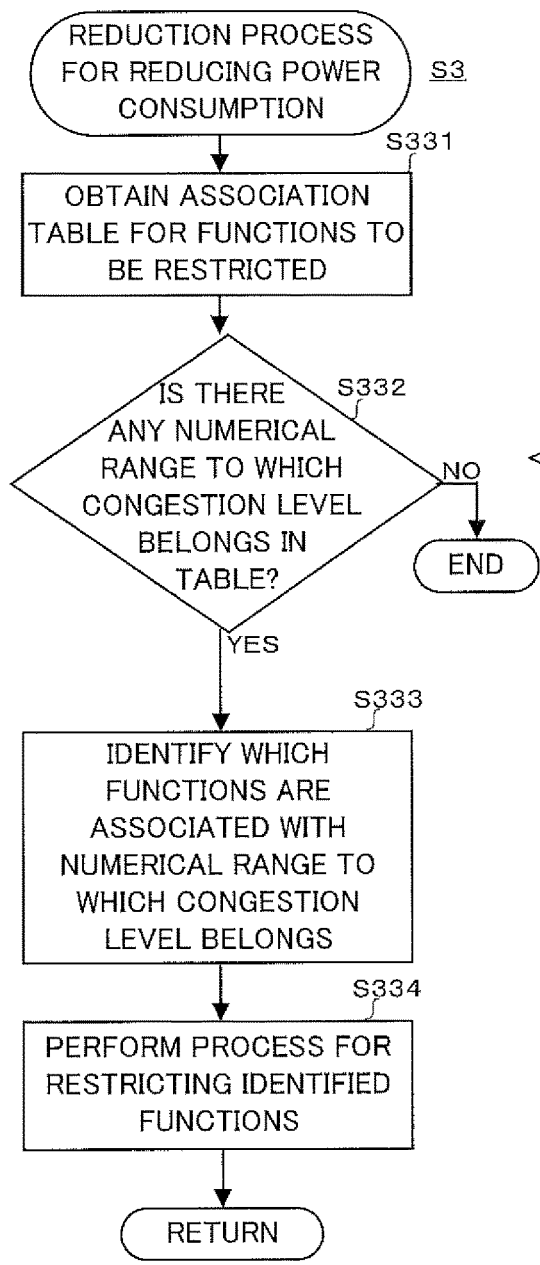
FIGS. 5A and 5B are each a flowchart showing details of the reduction process in Step S3 shown in FIG. 3.
Figure 6A:
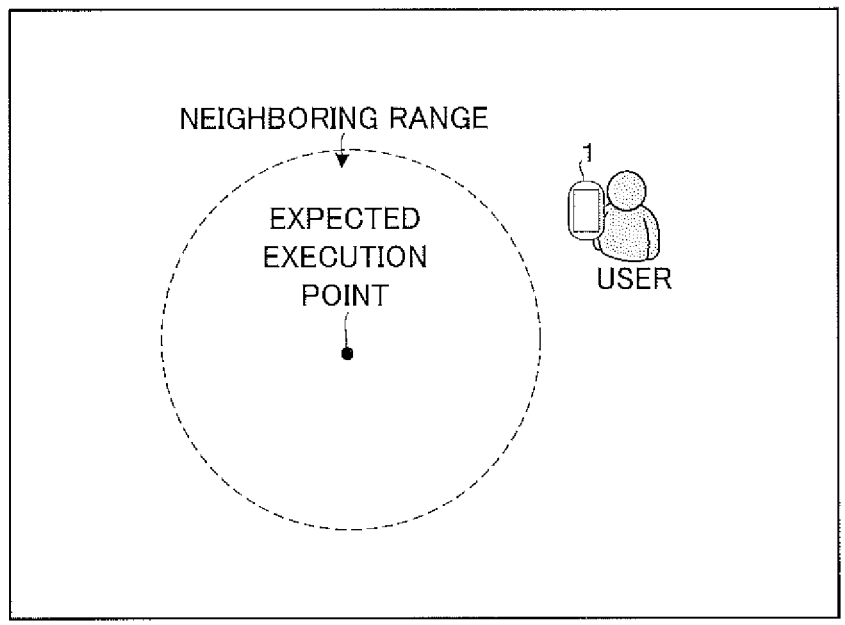
FIGS. 6A and 6B are each a conceptual diagram showing the positional relationship between the portable terminal 1 and an expected execution point of its specific function.
Figure 6B:
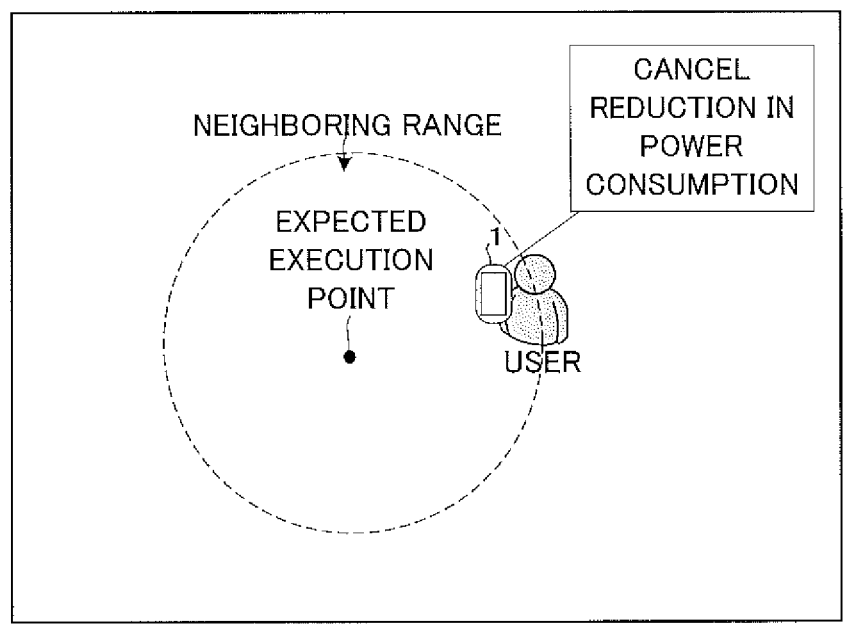

In the reduction process shown in FIG. 5A, the controller 19 (the reduction processor 192) obtains the association table for functions to be restricted (e.g., the table shown in FIG. 2A), for example, from the storage unit 17 (Step S331). The controller 19 (the reduction processor 192) then determines whether there is any numerical range to which the congestion level obtained in Step S2 belongs, by referring to the table obtained in Step S331 (Step S332). If it determines that there is no numerical range to which the congestion level belongs (NO in Step S332), the controller 19 (the reduction processor 192) terminates the reduction process shown in FIG. 5A. In this case, the controller 19 may return to Step S2 a predetermined period of time after the Step S332 and retry the determination in Step S332.

On the other hand, if it determines that there is a numerical range to which the congestion level belongs (YES in Step S332), the controller 19 (the reduction processor 192) identifies which functions are associated with the numerical range to which the congestion level belongs (Step S333). The controller 19 (the reduction processor 192) then performs a process for restricting the functions identified in Step S333 (S334) and returns to the process shown in FIG. 3.

Figure 5B:
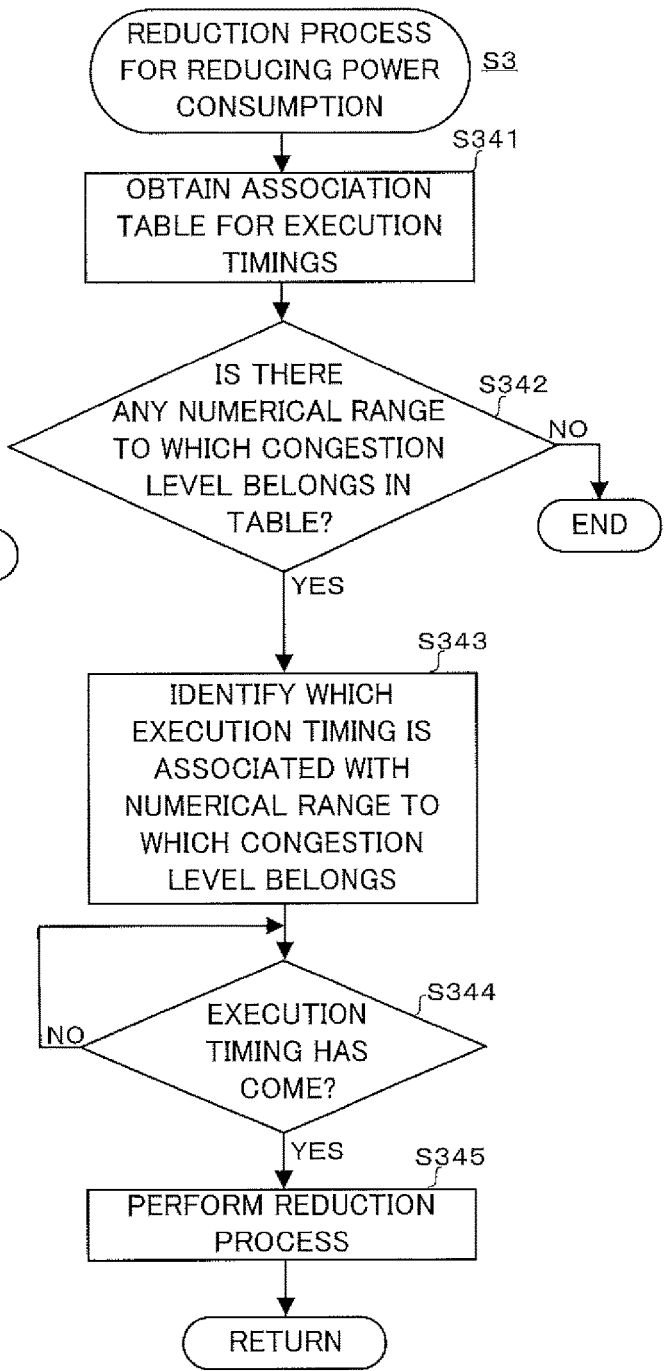

In the reduction process shown in FIG. 5B, the controller 19 (the reduction processor 192) obtains the association table for execution timings (e.g., the table shown in FIG. 2B or 2C), for example, from the storage unit 17 (Step S341). The controller 19 (the reduction processor 192) then determines whether there is any numerical range to which the congestion level obtained in Step S2 belongs, by referring to the table obtained in Step S341 (Step S342). If it determines that there is no numerical range to which the congestion level belongs (NO in Step S342), the controller 19 (the reduction processor 192) terminates the reduction process shown in FIG. 5B. In this case, the controller 19 may return to Step S2 a predetermined period of time after the Step S342 and retry the determination in Step S342.

On the other hand, if it determines that there is a numerical range to which the congestion level belongs (YES in Step S342), the controller 19 (the reduction processor 192) identifies which execution timing is associated with the numerical range to which the congestion level belongs from the above table (Step S343). The controller 19 (the reduction processor 192) then determines whether the execution timing identified in Step S343 has come (Step S344). For example, when using the table shown in FIG. 2B, the controller 19 (the reduction processor 192) determines whether the portable terminal 1 has entered within a predetermined distance (e.g., 300 meters) of the above expected execution point, based on current location information obtained at predetermined intervals by the location information obtainer 196 and on the point location information of the above expected execution point. More specifically, the controller 19 (the reduction processor 192) calculates the distance between the current location of the portable terminal 1 and the location of the above expected execution point, and then determines whether the calculated distance is less than or equal to the above predetermined distance. If the calculated distance is less than or equal to the above predetermined distance, it is determined that the portable terminal 1 has entered within the predetermined distance of the above expected execution point. On the other hand, when using the table shown in FIG. 2C, the controller 19 (the reduction processor 192) determines whether the current time has reached a predetermined time (e.g., 30 minutes) before the reference time, based on the current time obtained by the clock function of the portable terminal 1 and on the above reference time.

If it determines that the execution timing has not yet come (NO in Step S344), the controller 19 (the reduction processor 192) newly obtains the current location information or the current time, and repeats the determination in Step S344. On the other hand, if it determines that the execution timing has come (e.g., the portable terminal 1 has entered within the predetermined distance of the above expected execution point or the current time has reached the predetermined time before the above reference time) (YES in Step S344), the controller 19 (the reduction processor 192) performs the same process as in Step S312 (Step S345) and returns to the process shown in FIG. 3. The controller 19 (the reduction processor 192) may use a table that stores different execution timings and different sets of functions to be restricted in association with mutually different numerical ranges (or ranks). In this case, in Step S345, the controller 19 (the reduction processor 192) performs a process for restricting functions associated with the numerical range to which the congestion level obtained in Step S2 belongs.

Returning to the process shown in FIG. 3, in Step S4, the controller 19 (the reduction processor 192) determines whether the above reduction process is reducing power consumption of the battery 11. For example, while the above reduction process is restricting at least one of the APP functions, the wireless communication functions, and the GPS function of the portable terminal 1 (when the restriction is continuing), it is determined that the reduction in power consumption of the battery 11 is continuing. If it determines that the above reduction process is reducing power consumption of the battery 11 (YES in Step S4), the controller 19 (the reduction processor 192) causes the process to proceed to Step S5. On the other hand, when the above reduction process gives a notification message to the user that the portable terminal 1 should be switched into the power saving mode, it is determined that the reduction in power consumption of the battery 11 is not continuing. If it determines that the above reduction process is not reducing power consumption of the battery 11 (NO in Step S4), the controller 19 (the reduction processor 192) terminates the power consumption control process shown in FIG. 3. After the power consumption control process ends, the specific function of the portable terminal 1 is performed when the portable terminal 1 reaches the above expected execution point.

In Step S5, the controller 19 (the reduction processor 192) determines whether the portable terminal 1 has entered a range set as a neighboring range of the expected execution point. More specifically, the controller 19 (the reduction processor 192) calculates the distance between the current location of the portable terminal 1 and the location of the above expected execution point, based on current location information obtained at predetermined intervals by the location information obtainer 196 and on the point location information of the above expected execution point, and then determines whether the calculated distance is less than or equal to a distance corresponding to the above neighboring range (e.g., the distance between the edge and the center of the neighboring range). If the calculated distance is less than or equal to the distance corresponding to the neighboring range, it is determined that the portable terminal 1 has entered the neighboring range of the above expected execution point. Alternatively, the controller 19 (the reduction processor 192) determines whether the near field communication unit 14 has received the above-described radio signal for reduction cancellation. In this case, if the near field communication unit 14 has received the radio signal for reduction cancellation, it is determined that the portable terminal 1 has entered the neighboring range of the above expected execution point.

If it determines that the portable terminal 1 has not yet entered the neighboring range of the above expected execution point (NO in Step S5), the controller 19 (the reduction processor 192) newly obtains the current location information and repeats the determination in Step S5. In this case, as shown in FIG. 6A, the portable terminal 1 has not yet entered the neighboring range of the expected execution point (within the dashed line of the FIG. 6A). Thus, the reduction in the power consumption is not canceled. On the other hand, as shown in FIG. 6B, if it determines that the portable terminal 1 has entered the range set as the neighboring range of the expected execution point (YES in Step S5), the controller 19 (the reduction processor 192) cancels the reduction in power consumption of the battery 11 (Step S6) and then terminates the power consumption control process shown in FIG. 3. After the power consumption control process ends, the specific function of the portable terminal 1 is performed when the portable terminal 1 reaches the above expected execution point.

As described above, according to the above Example 1, the portable terminal 1 obtains a congestion level indicating congestion in a monitoring range including an expected execution point of a specific function of the portable terminal 1 and performs a reduction process for reducing power consumption of the battery 11 before arriving at the above expected execution point, based on the congestion level. This allows power consumption of the battery 11 to be flexibly reduced depending on congestion in a monitoring range including the expected execution point where the specific function of the portable terminal is expected to be executed. Consequently, power used for the specific function of the portable terminal 1 at the above expected execution point can be secured, and a shortage of power used for the above specific function at the expected execution point, which is caused by congestion of people in an area around the above expected execution point, can be prevented. For example, the portable terminal 1 does not become short of power (run out of battery) before a user (a user carrying the portable terminal 1) in a waiting line extending from an entrance of an event venue arrives at the entrance, thereby avoiding a situation where the portable terminal 1 fails to activate the function of displaying electronic ticket information based on electronic ticket data (an example of the specific function) and prevents the smooth running of the event. For example, in order to deal with such a situation, it is possible that the event organizer provides equipment for charging the battery 11 of the portable terminal 1. However, the equipment costs the organizer more.

Also according to the above Example 1, when the portable terminal 1 enters the neighboring range of the above expected execution point while the reduction in power consumption of the battery 11 is continuing, the reduction in the power consumption is canceled. This allows the reduction in power consumption of the battery 11 to be automatically canceled before execution of the specific function without placing any cancellation operation burden on the user of the portable terminal 1. Thus, the specific function can be executed quickly.

Example 2

Figure 8A:
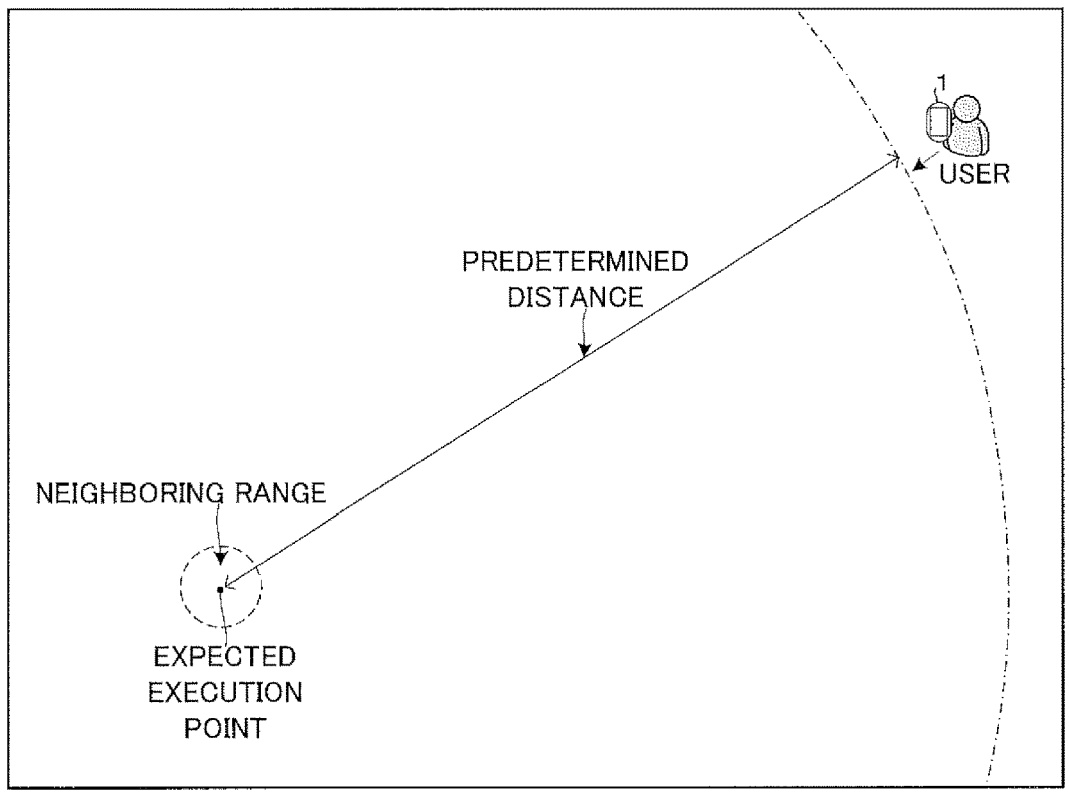
FIG. 8A is a conceptual diagram showing a case where the current location of the portable terminal 1 is not within a predetermined distance of the expected execution point of the specific function.
Figure 8B:
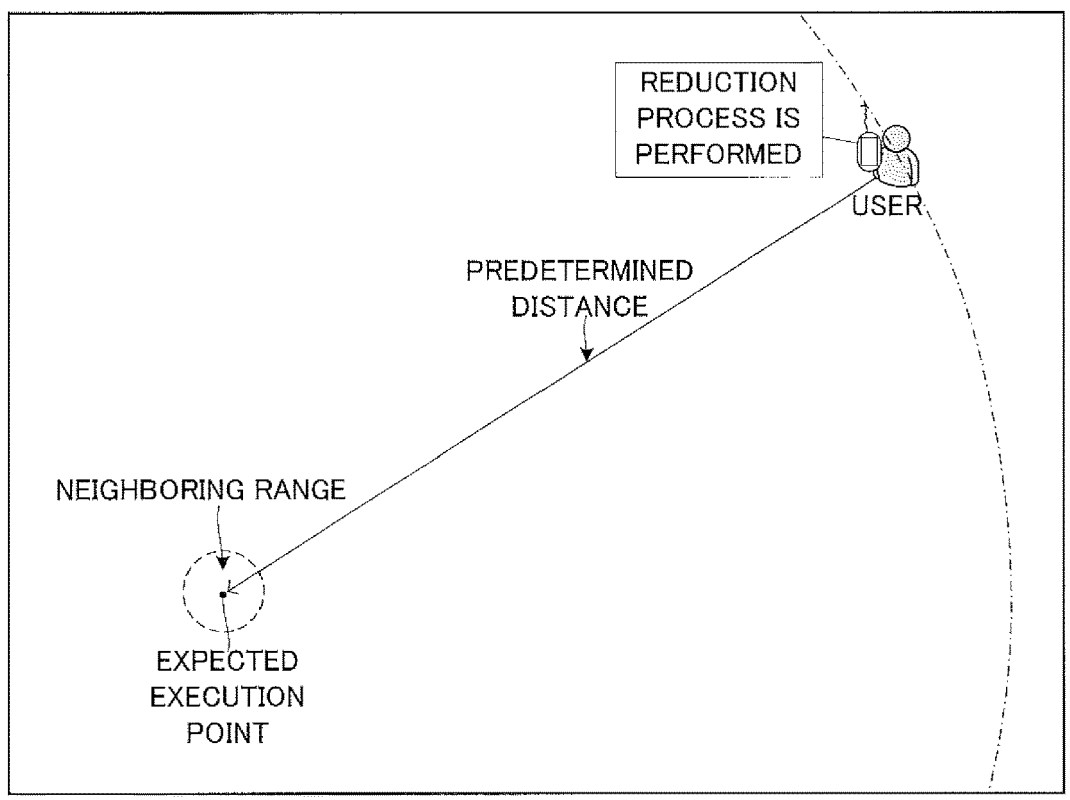
FIG. 8B is a conceptual diagram showing a case where the current location of the portable terminal 1 is within the predetermined distance from the expected execution point of the specific function.

The following describes how the portable terminal 1 according to Example 2 works, with reference to FIGS. 7 and 8. Example 2 is an example where another execution condition that the current location of the portable terminal 1 is within a predetermined distance of the expected execution point of the specific function is added to Example 1. FIG. 7 is a flowchart showing an example of the power consumption control process performed by the controller 19 of the portable terminal 1 in Example 2. FIG. 8A is a conceptual diagram showing a case where the current location of the portable terminal 1 is not within the predetermined distance of the expected execution point of the specific function. FIG. 8B is a conceptual diagram showing a case where the current location of the portable terminal 1 is within the predetermined distance from the expected execution point of the specific function.

The power consumption control process shown in FIG. 7 is started, for example, in response to instructions to launch the above power consumption control program from the user, as with the power consumption control process shown in FIG. 3. When the power consumption control process shown in FIG. 7 is started, the controller 19 obtains the point location information of the expected execution point of the specific function of the portable terminal 1 (Step S11). Subsequently, the controller 19 (the location information obtainer 196) obtains the current location information of the portable terminal 1 (Step S12). It is preferable that the current location information of the portable terminal 1 be obtained from the GPS receiver 15.

Next, the controller 19 (the reduction processor 192) determines whether the current location of the portable terminal 1 is within the predetermined distance (e.g., 1000 meters) of the above expected execution point, based on the point location information obtained in Step S11 and the current location information obtained in Step S12 (Step S13). More specifically, the controller 19 (the reduction processor 192) calculates the distance between the current location of the portable terminal 1 and the location of the above expected execution point, and then determines whether the calculated distance is less than or equal to the predetermined distance. If the calculated distance is less than or equal to the predetermined distance, it is determined that the current location of the portable terminal 1 is within the predetermined distance of the above expected execution point (i.e., it is determined that the portable terminal 1 has entered within the predetermined distance). Alternatively, the controller 19 (the reduction processor 192) defines a range that is a certain distance from the above expected execution point (e.g., a radius of 1000 meters from the expected execution point), and determines whether the current location indicated by the above current location information is included in the defined range. If the current location is included in the range, it is determined that the current location of the portable terminal 1 is within the predetermined distance of the above expected execution point.

As shown in FIG. 8A, if it determines that the current location of the portable terminal 1 is not within the predetermined distance of the above expected execution point (within the dot-dash line of the FIG. 8A) (NO in Step S13), the controller 19 (the reduction processor 192) returns to Step S12 to obtain the current location information and repeats the determination in Step S13. In this case, the above execution condition is not met. Thus, the above reduction process is not performed. On the other hand, as shown in FIG. 8B, if it determines that the current location of the portable terminal 1 is within the predetermined distance of the above expected execution point (YES in Step S13), the controller 19 (the reduction processor 192) causes the process to proceed to Step S14. When the current location information of the portable terminal 1 is obtained from the GPS receiver 15 in Step S12, the GPS function of the portable terminal 1 is not required in and after Step S14 (except when the above reduction process is performed using the table shown in FIG. 2B). Thus, the GPS function of the portable terminal 1 may be preferentially restricted.

In Step S14, a congestion level indicating congestion in a monitoring range including the expected execution point indicated by the above point location information is obtained, as in Example 1. Then in Step S15, as shown in any one of FIGS. 4A, 4B, 5A, and 5B, a reduction process is performed based on the congestion level, as in Example 1. Steps S16 to S18 shown in FIG. 7 are the same as Steps S4 to S6 shown in FIG. 3.

As described above, according to the above Example 2, only when the current location of the portable terminal 1 is within a predetermined distance of the above expected execution point (e.g., the portable terminal 1 has passed through the nearest station ticket gate to the expected execution point), the reduction process is performed as in Example 1. This allows power used for the specific function of the portable terminal 1 to be secured depending on the above congestion, while preventing the above reduction process from making the portable terminal 1 less convenient as much as possible.

Example 3

Figure 10A:
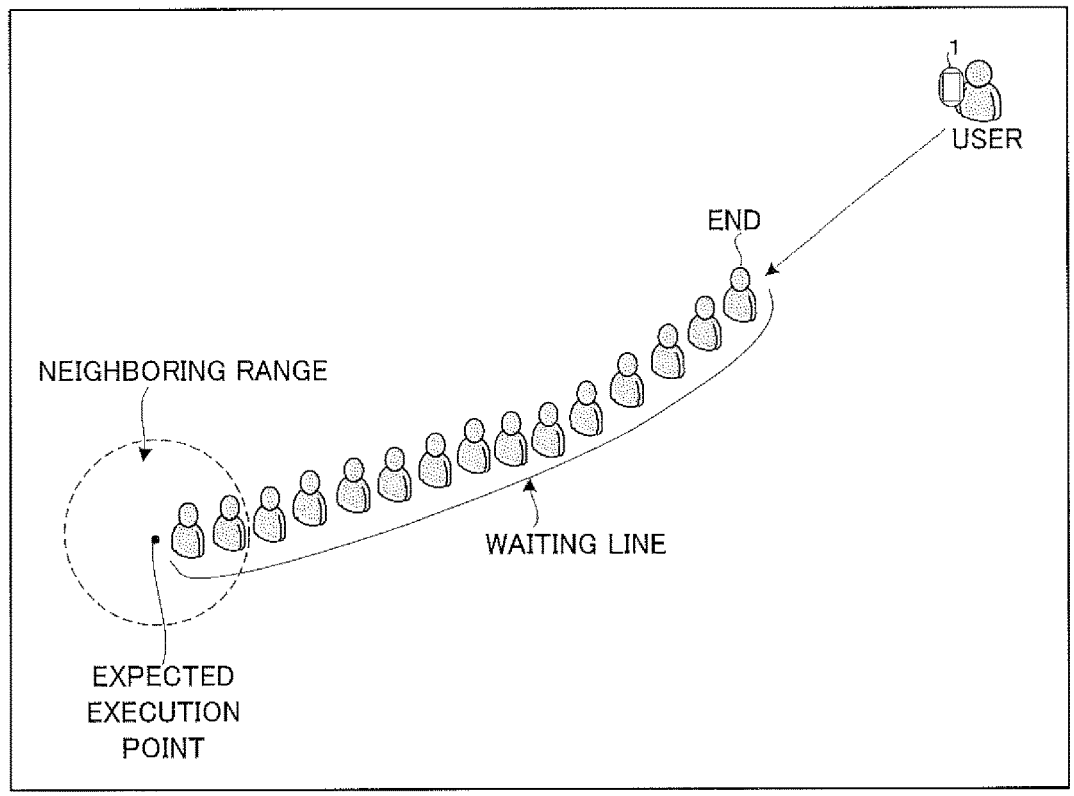
FIG. 10A is a conceptual diagram showing a case where the portable terminal 1 has not yet arrived at the end of a waiting line extending from the expected execution point of the specific function.
Figure 10B:
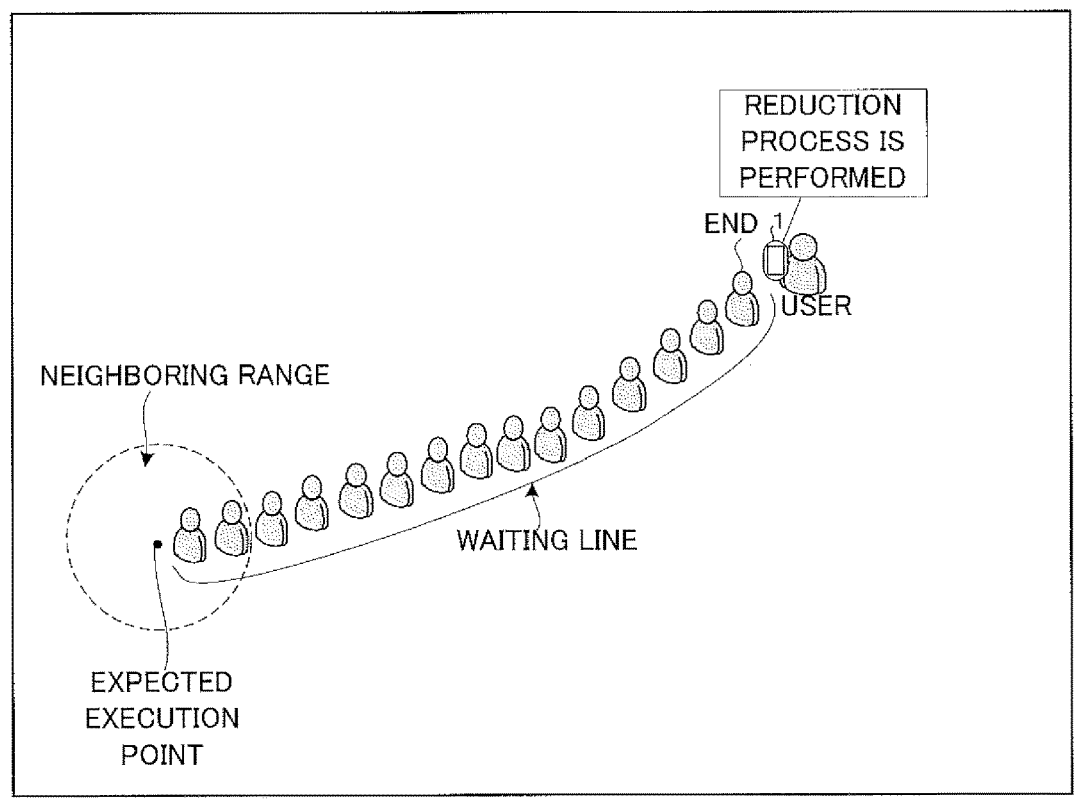
FIG. 10B is a conceptual diagram showing a case where the portable terminal 1 has arrived at the end of the waiting line extending from the expected execution point of the specific function.

The following describes how the portable terminal 1 according to Example 3 works, with reference to FIGS. 9 and 10. Example 3 is an example where another execution condition that the portable terminal 1 has arrived at the end of a waiting line extending from the expected execution point of the specific function is added to Example 1. FIG. 9 is a flowchart showing an example of the power consumption control process performed by the controller 19 of the portable terminal 1 in Example 3. FIG. 10A is a conceptual diagram showing a case where the portable terminal 1 has not yet arrived at the end of the waiting line extending from the expected execution point of the specific function. FIG. 10B is a conceptual diagram showing a case where the portable terminal 1 has arrived at the end of the waiting line extending from the expected execution point of the specific function.

The power consumption control process shown in FIG. 9 is started, for example, in response to instructions to launch the above power consumption control program from the user, as with the power consumption control process shown in FIG. 3. When the power consumption control process shown in FIG. 9 is started, the controller 19 obtains the point location information of the expected execution point of the specific function of the portable terminal 1 (Step S21).

Subsequently, the controller 19 obtains end location information indicating the location of the end of the waiting line extending from the above expected execution point (Step S22). For example, the location of the end can be identified by a measuring device installed within the above monitoring range to take photographs of the monitoring range with a camera. The end location information may, for example, be sent from the above measuring device to a predetermined information gathering server, and then be sent from the information gathering server to the portable terminal 1 over the mobile communication network, as with the above congestion level. For example, the controller 19 inquires of the above information gathering server end location information by using the point location information obtained in Step S21 as a key to obtain the end location information from the information gathering server via the mobile radio communication unit 12. Alternatively, as with the above congestion level, the controller 19 may obtain end location information included with point location information identical to the point location information obtained in Step S21, from radio signals received by the near field communication unit 14.

Subsequently, the controller 19 (the location information obtainer 196) obtains the current location information of the portable terminal 1 (Step S23). Next, the controller 19 (the end determiner 197) determines whether the portable terminal 1 has arrived at the end of the waiting line extending from the above expected execution point, based on the end location information obtained in Step S22 and the current location information obtained in Step S23 (Step S24). More specifically, the controller 19 (the end determiner 197) calculates the distance between the current location of the portable terminal 1 and the location of the end of the above waiting line, and then determines whether the calculated distance is less than or equal to a predetermined distance (e.g., approximately 1 meter). If the calculated distance is less than or equal to the predetermined distance, it is determined that the portable terminal 1 has arrived at the end.

As shown in FIG. 10A, if it determines that the portable terminal 1 has not yet arrived at the end of the waiting line extending from the above expected execution point (NO in Step S24), the controller 19 (the end determiner 197) returns to Step S22 to obtain the end location information and the current location information, and repeats the determination in Step S24. In this case, the above execution condition is not met. Thus, the above reduction process is not performed. On the other hand, as shown in FIG. 10B, if it determines that the portable terminal 1 has arrived at the end of the waiting line extending from the above expected execution point (YES in Step S24), the controller 19 (the end determiner 197) causes the process to proceed to Step S25.

In Step S24, the controller 19 (the end determiner 197) may determine whether the portable terminal 1 has arrived at the end of the waiting line extending from the above expected execution point, based on at what speed the portable terminal 1 is moving. For example, the controller 19 (the end determiner 197) determines whether the portable terminal 1 has arrived at the end of the waiting line by determining whether the portable terminal 1 keeps moving at a speed greater than or equal to a threshold value for a certain period of time (e.g., the portable terminal 1 moves at a certain speed for a certain period of time) and then moves at a speed less than the threshold value. The moving speed of the portable terminal 1 can be detected by a known method, for example, based on the current location information of the portable terminal 1 or wireless communications with a base station. When the portable terminal 1 includes an accelerometer, the moving speed of the portable terminal 1 may be detected based on acceleration information obtained by the accelerometer.

In Step S25, a congestion level indicating congestion in a monitoring range including the expected execution point indicated by the above point location information is obtained, as in Example 1. Then in Step S26, as shown in any one of FIGS. 4A, 4B, 5A, and 5B, a reduction process is performed based on the congestion level, as in Example 1. Steps S27 to S29 shown in FIG. 9 are the same as Steps S4 to S6 shown in FIG. 3.

As described above, according to the above Example 3, only when it is determined that the portable terminal 1 has arrived at the end of a waiting line extending from the above expected execution point, the reduction process is performed as in Example 1. This allows power used for the specific function of the portable terminal 1 to be secured depending on the above congestion, while preventing the above reduction process from making the portable terminal 1 less convenient as much as possible.

REFERENCE SIGNS LIST

1 portable terminal
11 battery
12 mobile radio communication unit
13 wireless LAN communication unit
14 near field communication unit
15 GPS receiver
16 input/display unit 17 storage unit
18 secure element
19 controller
191 congestion level obtainer
192 reduction processor
193 usage history obtainer
194 remaining power predictor
195 threshold value setter
196 location information obtainer
197 end determiner

The invention claimed is:

1. A portable terminal comprising:
a rechargeable battery;
at least one memory configured to store program code; and
at least one processor configured to access said at least one memory, read said program code, and operate according to said program code, said program code including:
congestion level obtaining code configured to cause at least one of said at least one processor to obtain a congestion level indicative of people-related congestion within a range that includes a location at which a specific function from among a plurality of executable functions of the portable terminal is expected to be executed; and
power consumption reduction code configured to cause at least one of said at least one processor to reduce, based on the obtained congestion level, power consumption of the battery before the portable terminal arrives at the location,
wherein the specific function is a function of outputting information generated based on specific electronic data to a reader installed at the location, or a function of sending the specific electronic data wirelessly to equipment installed at the location, or a function of receiving the specific electronic data wirelessly from the equipment installed at the location,
wherein the specific electronic data indicates that a user of the portable terminal has a specific certificate related to the specific function,
wherein the power consumption reduction code is further configured to cause at least one of said at least one processor to reduce the power consumption of the battery if the obtained congestion level is greater than or equal to a threshold value, and
wherein the program code further includes:
usage history obtaining code configured to cause at least one of said at least one processor to obtain a function usage history of the portable terminal;
predicting code configured to cause at least one of said at least one processor to predict, based on the obtained usage history, an amount of remaining power of the battery in a time slot including an expected execution time of the specific function at the location; and
setting code configured to cause at least one of said at least one processor to set the threshold value, wherein the smaller the predicted amount of remaining power is, the smaller the threshold value is set.

2. The portable terminal according to claim 1, wherein the program code further includes location obtaining code configured to cause at least one of said at least one processor to obtain location information indicating a current location of the portable terminal, and
the power consumption reduction code is further configured to cause at least one of said at least one processor to evaluate whether the obtained current location of the portable terminal is within a pre-set distance from the location at which the specific function of the portable terminal is expected to be executed; and
if the portable terminal is within the pre-set distance from the location, reduce the power consumption of the battery before the portable terminal arrives at the location.

3. The portable terminal according to claim 2, wherein the pre-set distance is adjusted to a greater distance as the obtained congestion level is higher and is adjusted to a shorter distance as the obtained congestion level is lower.

4. The portable terminal according to claim 1, wherein the program code further includes determining code configured to cause at least one of said at least one processor to determine whether the portable terminal has arrived at an end of a line extending from the location at which the specific function of the portable terminal is expected to be executed, and if it is determined that the portable terminal has arrived at the end of the line extending from the location, reduce the power consumption of the battery.

5. The portable terminal according to claim 1, wherein the power consumption reduction code is further configured to cause at least one of said at least one processor to restrict, based on the obtained congestion level, an execution of at least one of the plurality of executable functions of the portable terminal except for the specific function, each of the plurality of executable functions being executed by using the battery.

6. The portable terminal according to claim 5, wherein a number of the at least one of the plurality of executable functions of which the execution is restricted becomes greater as the obtained congestion level is higher or becomes less as the obtained congestion level is lower.

7. The portable terminal according to claim 1, wherein the power consumption reduction code is further configured to cause at least one of said at least one processor to cancel reducing the power consumption of the battery when the portable terminal enters a range pre-set as a neighboring range of the location while the power consumption of the battery is being reduced.

8. The portable terminal according to claim 1, wherein the power consumption reduction code is further configured to cause at least one of said at least one processor to reduce, based on the obtained congestion level, the power consumption of the battery at a different timing.

9. The portable terminal according to claim 1, wherein the specific electronic data is electronic ticket data, electronic certificate data, or electronic value data.

10. The portable terminal according to claim 1, wherein the specific function is the function of sending the specific electronic data wirelessly to the equipment installed at the location.

11. The portable terminal according to claim 1, wherein the specific electronic data is prestored in the portable terminal.

12. The portable terminal according to claim 1, wherein the specific electronic data is stored in a secure memory of the portable terminal.

13. The portable terminal according to claim 1, wherein the power consumption reduction code is configured to cause at least one of said at least one processor to reduce the power consumption of the battery according to satisfaction of a preset condition, the preset condition defining an execution timing of reducing the power consumption, wherein the preset condition is based on congestion levels such that the execution timing is earlier as the obtained congestion level is higher.

14. The portable terminal according to claim 13, wherein the obtained congestion level is compared with two or more thresholds to determine a rank to which the obtained congestion level belongs to, among a plurality of ranks, and wherein the preset condition comprises a plurality of preset conditions corresponding to the plurality of ranks, respectively, and the power consumption of the battery is reduced according to satisfaction of a preset condition, among the plurality of preset conditions, that corresponds to the determined rank to which the obtained congestion level belongs to.

15. The portable terminal according to claim 13, wherein the preset condition defines the execution timing of reducing the power consumption to be a pre-set period prior to the expected execution time of the specific function at the location, and the pre-set period is longer as the obtained congestion level is higher.

16. The portable terminal according to claim 13, wherein the specific function is a function of sending the specific electronic data wirelessly to equipment installed at the location, or a function of receiving the specific electronic data wirelessly from the equipment installed at the location, and the specific electronic data comprises at least one of electronic ticket data, electronic certificate data, or electronic value data.

17. The portable terminal according to claim 1, wherein the specific electronic data comprises a two-dimensional bar code, and the specific function is the function of sending the specific electronic data wirelessly to the equipment installed at the location by scanning the two-dimensional bar code.

18. A power consumption control method comprising:
obtaining, by a portable terminal comprising a battery, a congestion level indicative of people-related congestion within a range that includes a location at which a specific function from among a plurality of executable functions of the portable terminal is expected to be executed; and
reducing, by the portable terminal, based on the obtained congestion level, power consumption of the battery before the portable terminal arrives at the location,
wherein the specific function is a function of outputting information generated based on specific electronic data to a reader installed at the location, or a function of sending the specific electronic data wirelessly to equipment installed at the location, or a function of receiving the specific electronic data wirelessly from the equipment installed at the location,
wherein the specific electronic data indicates that a user of the portable terminal has a specific certificate related to the specific function,
wherein the reducing the power consumption comprises reducing the power consumption of the battery if the obtained congestion level is greater than or equal to a threshold value, and
wherein the method further comprises:
obtaining a function usage history of the portable terminal;
predicting, based on the obtained usage history, an amount of remaining power of the battery in a time slot including an expected execution time of the specific function at the location; and
setting the threshold value, wherein the smaller the predicted amount of remaining power is, the smaller the threshold value is set.

19. A power consumption control method comprising:
obtaining, by a portable terminal comprising a battery, a congestion level indicative of people-related congestion within a range that includes a location at which a specific function from among a plurality of executable functions of the portable terminal is expected to be executed; and
reducing, by the portable terminal, based on the obtained congestion level, power consumption of the battery before the portable terminal arrives at the location,
wherein the specific function is a function of outputting information generated based on specific electronic data to a reader installed at the location, or a function of sending the specific electronic data wirelessly to equipment installed at the location, or a function of receiving the specific electronic data wirelessly from the equipment installed at the location,
wherein the specific electronic data indicates that a user of the portable terminal has a specific certificate related to the specific function, and
wherein the specific electronic data comprises a two-dimensional bar code, and the specific function is the function of sending the specific electronic data wirelessly to the equipment installed at the location by scanning the two-dimensional bar code.

20. A portable terminal comprising:
a rechargeable battery;
at least one memory configured to store program code; and
at least one processor configured to access said at least one memory, read said program code, and operate according to said program code, said program code including:
congestion level obtaining code configured to cause at least one of said at least one processor to obtain a congestion level indicative of people-related congestion within a range that includes a location at which a specific function from among a plurality of executable functions of the portable terminal is expected to be executed; and
power consumption reduction code configured to cause at least one of said at least one processor to reduce, based on the obtained congestion level, power consumption of the battery before the portable terminal arrives at the location,
wherein the specific function is a function of outputting information generated based on specific electronic data to a reader installed at the location, or a function of sending the specific electronic data wirelessly to equipment installed at the location, or a function of receiving the specific electronic data wirelessly from the equipment installed at the location,
wherein the specific electronic data indicates that a user of the portable terminal has a specific certificate related to the specific function, and
wherein the specific electronic data comprises a two-dimensional bar code, and the specific function is the function of sending the specific electronic data wirelessly to the equipment installed at the location by scanning the two-dimensional bar code.

21. The portable terminal according to claim 20, wherein the program code further includes location obtaining code configured to cause at least one of said at least one processor to obtain location information indicating a current location of the portable terminal, and
the power consumption reduction code is further configured to cause at least one of said at least one processor to evaluate whether the obtained current location of the portable terminal is within a pre-set distance from the location at which the specific function of the portable terminal is expected to be executed; and if the portable terminal is within the pre-set distance from the location, reduce the power consumption of the battery before the portable terminal arrives at the location.

22. The portable terminal according to claim 21, wherein the pre-set distance is adjusted to a greater distance as the obtained congestion level is higher and is adjusted to a shorter distance as the obtained congestion level is lower.

23. The portable terminal according to claim 20, wherein the program code further includes determining code configured to cause at least one of said at least one processor to determine whether the portable terminal has arrived at an end of a line extending from the location at which the specific function of the portable terminal is expected to be executed, and if it is determined that the portable terminal has arrived at the end of the line extending from the location, reduce the power consumption of the battery.

24. The portable terminal according to claim 20, wherein the power consumption reduction code is further configured to cause at least one of said at least one processor to restrict, based on the obtained congestion level, an execution of at least one of the plurality of executable functions of the portable terminal except for the specific function, each of the plurality of executable functions being executed by using the battery.

25. The portable terminal according to claim 24, wherein a number of the at least one of the plurality of executable functions of which the execution is restricted becomes greater as the obtained congestion level is higher or becomes less as the obtained congestion level is lower.

26. The portable terminal according to claim 20, wherein the power consumption reduction code is further configured to cause at least one of said at least one processor to cancel reducing the power consumption of the battery when the portable terminal enters a range pre-set as a neighboring range of the location while the power consumption of the battery is being reduced.

27. The portable terminal according to claim 20, wherein the power consumption reduction code is further configured to cause at least one of said at least one processor to reduce, based on the obtained congestion level, the power consumption of the battery at a different timing.

28. The portable terminal according to claim 20, wherein the specific electronic data is electronic ticket data, electronic certificate data, or electronic value data.

29. The portable terminal according to claim 20, wherein the specific function is the function of sending the specific electronic data wirelessly to the equipment installed at the location.

30. The portable terminal according to claim 20, wherein the specific electronic data is prestored in the portable terminal.

31. The portable terminal according to claim 20, wherein the specific electronic data is stored in a secure memory of the portable terminal.

32. The portable terminal according to claim 20, wherein the power consumption reduction code is configured to cause at least one of said at least one processor to reduce the power consumption of the battery according to satisfaction of a preset condition, the preset condition defining an execution timing of reducing the power consumption, wherein the preset condition is based on congestion levels such that the execution timing is earlier as the obtained congestion level is higher.

33. The portable terminal according to claim 32, wherein the obtained congestion level is compared with two or more thresholds to determine a rank to which the obtained congestion level belongs to, among a plurality of ranks, and wherein the preset condition comprises a plurality of preset conditions corresponding to the plurality of ranks, respectively, and the power consumption of the battery is reduced according to satisfaction of a preset condition, among the plurality of preset conditions, that corresponds to the determined rank to which the obtained congestion level belongs to.

34. The portable terminal according to claim 32, wherein the preset condition defines the execution timing of reducing the power consumption to be a pre-set period prior to an expected execution time of the specific function at the location, and the pre-set period is longer as the obtained congestion level is higher.

35. The portable terminal according to claim 32, wherein the specific function is a function of sending the specific electronic data wirelessly to equipment installed at the location, or a function of receiving the specific electronic data wirelessly from the equipment installed at the location, and the specific electronic data comprises at least one of electronic ticket data, electronic certificate data, or electronic value data.

* * * * *